(12) United States Patent
Lilbaek et al.

(10) Patent No.: US 12,364,273 B2
(45) Date of Patent: Jul. 22, 2025

(54) PROCESS FOR PREPARING AN ACIDIFIED MILK PRODUCT

(71) Applicant: Novozymes A/S, Bagsvaerd (DK)

(72) Inventors: Hanna Maria Lilbaek, Copenhagen (DK); Hans Peter Heldt-Hansen, Virum (DK); Jens Magnus Eklof, Frederiksberg (DK)

(73) Assignee: Novozymes A/S, Bagsvaerd (DK)

( * ) Notice: Subject to any disclaimer, the term of this patent is extended or adjusted under 35 U.S.C. 154(b) by 488 days.

(21) Appl. No.: 17/617,035

(22) PCT Filed: Jun. 26, 2020

(86) PCT No.: PCT/EP2020/068117
§ 371 (c)(1),
(2) Date: Dec. 7, 2021

(87) PCT Pub. No.: WO2021/004817
PCT Pub. Date: Jan. 14, 2021

(65) Prior Publication Data
US 2022/0256871 A1    Aug. 18, 2022

(30) Foreign Application Priority Data
Jul. 5, 2019   (EP) .................................. 19184782

(51) Int. Cl.
A23C 9/12      (2006.01)
A23C 9/127     (2006.01)
A23J 3/34      (2006.01)

(52) U.S. Cl.
CPC .......... *A23C 9/1209* (2013.01); *A23C 9/1216* (2013.01); *A23C 9/1275* (2013.01); *A23J 3/343* (2013.01); *C12Y 203/02013* (2013.01); *C12Y 304/21004* (2013.01)

(58) Field of Classification Search
CPC ... A23C 9/1209; A23C 9/1216; A23C 9/1275; A23J 3/343; C12Y 203/02013; C12Y 304/21004
USPC .......................................................... 426/43
See application file for complete search history.

(56) References Cited

U.S. PATENT DOCUMENTS

| | | | |
|---|---|---|---|
| 6,416,797 B1 | 9/2002 | Han | |
| 2002/0043159 A1* | 4/2002 | Kumazawa | A23C 19/0328 99/452 |
| 2022/0256871 A1* | 8/2022 | Lilbaek | A23C 9/1275 |

FOREIGN PATENT DOCUMENTS

| | | |
|---|---|---|
| CN | 101854806 A | 10/2010 |
| CN | 101917866 A | 12/2010 |
| CN | 107568335 A | 1/2018 |
| EP | 0671885 B1 | 8/1999 |
| EP | 1186238 A2 | 3/2002 |
| EP | 1749447 A1 | 2/2007 |
| JP | 2002065158 A | 2/2005 |
| WO | 2005/013710 A1 | 2/2005 |
| WO | 2007/060288 A1 | 5/2007 |
| WO | 2008131008 A2 | 10/2008 |
| WO | 2008/138900 A1 | 11/2008 |
| WO | 2009016257 A2 | 2/2009 |

(Continued)

*Primary Examiner* — Brent T O'Hern
(74) *Attorney, Agent, or Firm* — Yoshimi D. Barron

(57) ABSTRACT

The present invention relates to preparation of an acidified milk product using a transglutaminase and a trypsin-like or lysine-specific endopeptidase.

18 Claims, 2 Drawing Sheets

Specification includes a Sequence Listing.

(56) References Cited

FOREIGN PATENT DOCUMENTS

WO 2010/089376 A2 8/2010

\* cited by examiner

PROCESS FOR PREPARING AN ACIDIFIED MILK PRODUCT

CROSS-REFERENCE TO RELATED APPLICATIONS

This application is a 35 U.S.C. 371 national application of international application no. PCT/EP2020/068117 filed Jun. 26, 2020, which claims priority or the benefit under 35 U.S.C. 119 of European application no. 19184782.1 filed Jul. 5, 2019. The content of each application is fully incorporated herein by reference.

REFERENCE TO SEQUENCE LISTING

This application contains a Sequence Listing in computer readable form. The computer readable form is incorporated herein by reference.

FIELD OF THE INVENTION

The present invention relates to preparation of an acidified milk product using a transglutaminase and a protease.

BACKGROUND OF THE INVENTION

The market for acidified milk products is increasing worldwide and there is an interest in improving the quality and economics of such products.

The use of transglutaminase enzymes for modification of food proteins, including dairy proteins, is known in the prior art. For instance, EP0671885 describes a method for production of a milk like product comprising transglutaminase treatment followed by acidification. Herein, a transglutaminase treated milk like product where acidification is performed as a biological fermentation is shown to exhibit a consistency of a semi-solid yoghurt. Treatment with transglutaminase during the manufacturing of fermented milk products is known to increase the viscosity of the product. WO2007/060288 demonstrates that addition of transglutaminase during the production of fermented milk products such as yoghurt allows for reducing the protein content of the milk substrate to still obtain a yoghurt having a high viscosity.

EP1186238 A2 discloses a method for enhancing the yield of a cheese which includes treatment of a milk material with a milk coagulating enzyme followed by separation of cheese curd from whey, where partially hydrolysed whey protein has been added to the milk material prior to the treatment with coagulating enzyme. The partially hydrolysed whey protein may have been obtained by heating, by cutting by chemical or enzymatic reduction, or by protease treatment using, e.g., trypsin. The milk material comprising the partially hydrolysed whey protein may have been treated with transglutaminase prior to the treatment with coagulating enzyme. Acidification of the milk substrate to obtain an acidified milk product is not disclosed. And neither is the effect of enzyme treatments on structural properties such as graininess/flakiness, viscosity or syneresis.

WO 2010/089376 discloses a process for preparing an acidified milk product where a transglutaminase is used in combination with a protease. Addition of the protease is shown to reduce the fermentation time. Use of proteases classified in any of EC 3.4.21, 3.4.22, 3.4.23 or 3.4.24 is disclosed, in particular proteases classified in EC 3.4.21.62, EC 3.4.22.2, EC 3.4.23.4, EC 3.4.24.28, Neutrase®, Alcalase®, subtilisin A (Type VIII), papain, chymosin, Colorase N, Optimase or Protease N "Amano". Neutrase® (EC 3.4.24) is experimentally shown to have a beneficial effect on the fermentation time.

SUMMARY OF THE INVENTION

The use of transglutaminase can increase the viscosity and reduce syneresis (whey separation) of fermented dairy products such as yoghurt. However, the enzyme treatment can cause other texture defects, principally graininess or flakiness. The present invention shows that combination of proteases with transglutaminase can reduce the graininess/flakiness and thus improve the visual appearance and mouthfeel of the yoghurt product, while obtaining the desired viscosity increase and reduced syneresis.

In particular, combination of transglutaminase with a trypsin-like or lysine-specific endopeptidase has been found to result in overall better texture, viscosity increase and reduced syneresis compared to other endopeptidases.

The present invention provides a process for preparing an acidified milk product, the process comprising:
(a) treating a milk substrate with a transglutaminase and a trypsin-like or lysine-specific endopeptidase; and
(b) acidifying the milk substrate by incubating with a chemical acidifier and/or a lactic acid bacterium to produce the acidified milk product;
wherein step (a) is performed before or during step (b).

The trypsin-like endopeptidase is preferably classified in EC 3.4.21.4.

The lysine-specific endopeptidase is preferably classified in EC 3.4.21.4.

DETAILED DESCRIPTION OF THE INVENTION

Figure 1:
FIG. 1 shows the results of sensory evaluation of the yoghurts of Example 1.

The invention provides a process for preparing an acidified milk product, the process comprising:
(a) treating a milk substrate with a transglutaminase and a trypsin-like or lysine-specific endopeptidase; and
(b) acidifying the milk substrate by incubating with a chemical acidifier and/or a lactic acid bacterium to produce the acidified milk product;
wherein step (a) is performed before or during step (b).

As used herein, the term "milk substrate" may encompass any milk or milk product obtained from a mammal, preferably cow milk, ewe milk or goat milk. In one embodiment, the milk substrate may be derived from full-fat milk. In a preferred embodiment, the milk substrate may be derived from reduced fat milk such as 1% fat milk, 0.1% fat milk, semi-skimmed milk or skimmed milk. The milk substrate may be reconstituted skim milk powder, casein, whey protein (WPI or WPC), milk protein concentrate, or any combination thereof. The milk substrate may be concentrated, such as by membrane filtration technologies or evaporation. The milk substrate may be UHT milk.

The milk substrate may have been standardized and/or homogenized. The milk substrate may have been pasteurized or otherwise heat-treated.

An acidified milk product in the context of the present invention is a milk-based product which is produced by acidification.

In one embodiment, acidification is performed by incubating with a lactic acid bacterium, preferably of the genus *Streptococcus, Lactococcus, Lactobacillius, Leuconostoc, Pseudoleuconostoc, Pediococcus, Propionibacterium, Enterococcus, Brevibacterium*, or *Bifidobacterium* or any combination thereof. Acidification by incubating with one or more lactic acid bacteria may be referred to as fermentation.

In one embodiment, acidification is performed by incubating with a thermophilic lactic acid bacterium.

In one embodiment, acidification is performed by incubating with a mesophilic lactic acid bacterium.

In another embodiment, acidification is performed by incubating with a chemical acidifier, preferably glucono delta-lactone (GDL).

The acidified milk product may be a spoonable acidified milk product, e.g. stirred yoghurt, set-type yoghurt or strained yoghurt, or a drinkable acidified milk product, e.g. drinking yoghurt, kefir or buttermilk.

Stirred yoghurt may be produced by carrying out acidification in fermentation tanks where the formed acid gel is disrupted e.g. by agitation after acidification when the desired pH has been obtained. The stirred product may be partially cooled to 20-30° C. and flavoring ingredients may be added. The stirred product is pumped to filling line and filled in retail containers. The stirred yoghurt product may then be cooled and then stored.

A set yoghurt may be acidified in retail container and not agitated after acidification. After acidification, a set yoghurt may be cooled and then stored. The cooling may be carried out in blast chiller tunnel or in a refrigerated storage room.

The term "after acidification" as used herein means when acidification is ended and the desired pH obtained.

Strained yoghurt, such as Greek yoghurt or labneh, is yoghurt that has been strained to remove most of its whey, resulting in a thicker consistency than unstrained yoghurt, while preserving yoghurt's distinctive sour taste.

If using a chemical acidifier, the desired pH may be, e.g., around pH 4.5.

If acidification is performed using fermentation with a microorganism, the pH after acidification may preferably be between 3.5 and 5.5, most preferably between 4 and 5.

In one embodiment, the acidified milk product is a stirred yoghurt wherein agitation is performed during or following the acidification step.

In one embodiment, the acidified milk product is cooled, preferably immediately.

A stirred yoghurt may be cooled down to approx. 20-25° C. in the fermentation tank. Then, agitation, e.g. by stirring, may be performed to break the gel. The yoghurt may then be pumped to the filling line followed by a second cooling step to storage temperature approximately 5° C. by blast chilling in cooling tunnels or slower in a refrigerated storage room.

Alternatively, for stirred yoghurt, the acidified product may be first stirred to break the gel, then cooled down to approximately 20-25° C. by heat exchanger in the line towards the filling station, and then in a second cooling step cooled down to storage temperature approximately 5° C. by blast chilling in cooling tunnels or slower in a refrigerated storage room.

The process for set yoghurt may be: After acidification in retail pot (carried out in tempered room), the yoghurt is cooled down to storage temperature approximately 5° C. by blast chilling in cooling tunnels or slower in a refrigerated storage room.

The process of the invention may further include a storage step after acidification. This may be carried out after agitation, e.g. by stirring or pumping, and/or cooling (one or more times), preferably after both. Storage may be carried out at a low temperature, preferably less than 10° C., more preferably 0-10° C., such as 4-6° C.

In a preferred embodiment, the acidified milk product is yoghurt, set-type yoghurt, stirred yoghurt, strained yoghurt, drinking yoghurt, kefir, buttermilk, fresh cheese, fromage frais, creme fraiche, quark, cottage cheese or fermented milk.

In a more preferred embodiment, the acidified milk product is a spoonable acidified milk product, preferably yoghurt.

In the process of the present invention, a pasteurization step is preferably performed before step (b). This may be to thermally inactivate microorganisms and/or to better control the acidification. Pasteurization before acidification may also give a better structure of the acidified milk product.

Pasteurization may be performed, e.g., at 80-95° C. for 1-30 minutes, such as at 80-85° C. for 30 minutes or at 90-95° C. for 2-5 minutes.

In the process of the invention, step (a) may be performed before step (b). A pasteurization step may be performed after step (a) and before step (b). In that case, the pasteurization will inactivate the enzymes prior to the acidification.

In step (a), the milk substrate is treated with a transglutaminase and a trypsin-like or lysine-specific endopeptidase. The treatment with the enzymes may be performed sequentially. E.g., the trypsin-like or lysine-specific endopeptidase may be added to the milk substrate, and after some time, such as, e.g., 30-60 minutes, the transglutaminase is added. Or the treatment with the trypsin-like or lysine-specific endopeptidase may be performed first, optionally followed by a pasteurization step, and then the transglutaminase is added, e.g., at the same time as the acidifying agent. Alternatively, the transglutaminase may be added before, such as, e.g., 30-60 minutes before, or after, such as, e.g., 30-60 minutes after the acidifying agent.

Alternatively, the transglutaminase may be added to the milk substrate, and after some time, such as, e.g., 30-60 minutes, the trypsin-like or lysine-specific endopeptidase is added. Or the treatment with the transglutaminase may be performed first, optionally followed by a pasteurization step, and then the trypsin-like or lysine-specific endopeptidase is added, e.g., at the same time as the acidifying agent. Or the trypsin-like or lysine-specific endopeptidase may be added before, such as, e.g., 30-60 minutes before, or after, such as, e.g., 30-60 minutes after the acidifying agent.

In a preferred embodiment, step (a) and step (b) are performed simultaneously. Both enzymes and the acidifying agent may be added at the same time or essentially at the same time. Or the trypsin-like or lysine-specific endopeptidase may be added first, then the transglutaminase, then the acidifying agent. Or the trypsin-like or lysine-specific endopeptidase may be added first, then the acidifying agent, then the transglutaminase. Or the acidifying agent may be added first, then the trypsin-like or lysine-specific endopeptidase, then the transglutaminase. Or the transglutaminase may be added first, then the trypsin-like or lysine-specific endopeptidase, then the acidifying agent. Or the transglutaminase may be added first, then the acidifying agent, then the trypsin-like or lysine-specific endopeptidase. Or the acidifying agent may be added first, then the transglutaminase, then the trypsin-like or lysine-specific endopeptidase.

In a preferred embodiment, step (a) is performed before and/or during step (b). I.e., the enzymes are added and after incubation for some time, e.g., 0.5-3 hours, the acidifying agent is added and the incubation is continued.

In a preferred embodiment, a pasteurization step is performed before step (a).

In another preferred embodiment, step (a) and step (b) are performed simultaneously and a pasteurization step is performed before step (a).

In a preferred embodiment, step (a) is performed before and/or during step (b) and a pasteurization step is performed before step (a).

If step (a) is performed before step (b), the enzyme treatment may be performed, e.g., at 40-55° C., such as at 45-55° C., for 15 minutes to 10 hours, such as for 30 minutes to 3 hours.

The acidification in step (b) is performed until the desired pH is reached. It is well-known in the art how to choose the optimal temperature and incubation time for the acidification. The acidification may be performed, e.g., at 40-45° C. for 3-10 hours, such as for 4-7 hours. Lower temperatures such as down to 20-30° C., may be used for mesophilic cultures.

In a preferred embodiment, the acidified milk product has a more smooth texture compared to an acidified milk product prepared by the same process but without treating with a trypsin-like or lysine-specific endopeptidase. In another preferred embodiment, the acidified milk product has a less grainy and/or lumpy texture compared to an acidified milk product prepared by the same process but without treating with a trypsin-like or lysine-specific endopeptidase. In another preferred embodiment, the acidified milk product has a thicker texture compared to an acidified milk product prepared by the same process but without treating with a transglutaminase and a trypsin-like or lysine-specific endopeptidase. Preferably, the texture is visually evaluated by placing a sample of the acidified milk product on the backside of a black plastic spoon.

In another preferred embodiment, the viscosity of the acidified milk product is at most 25% reduced, preferably at most 20%, at most 15%, at most 10%, such as at most 5%, reduced, compared to an acidified milk product prepared by the same process but without treating with a trypsin-like or lysine-specific endopeptidase. Viscosity may be determined by allowing the acidified milk product to set for 1 hour at 4° C. followed by viscosity measurement at 25° C. at 50 rpm during 70 seconds.

In another preferred embodiment, the acidified milk product after 16 days storage at 4° C. has expelled at most 10%, such as at most 5%, more whey compared to an acidified milk product prepared by the same process but without treating with a trypsin-like or lysine-specific endopeptidase. The amount of expelled whey may be calculated using the formula: (weight of yoghurt sample−weight of solid phase)/(weight of yoghurt sample)*100%.

In another preferred embodiment, the acidified milk product after 16 days storage at 4° C. has expelled at most 1% whey.

In another preferred embodiment, the acidified milk product after 16 days storage at 4° C. has expelled at most 10%, such as at most 5%, more whey compared to an acidified milk product prepared by the same process but without treating with a trypsin-like or lysine-specific endopeptidase; or, if an acidified milk product prepared by the same process but without treating with a trypsin-like or lysine-specific endopeptidase has expelled zero whey after 16 days storage at 4° C., the acidified milk product obtained after steps (a) and (b) has expelled at most 1% whey.

In another preferred embodiment, the acidified milk product after 6 days storage at 4° C. followed by centrifugation for 15 minutes at 3500 rpm has expelled at most 10%, such as at most 5%, more whey compared to an acidified milk product prepared by the same process but without treating with a trypsin-like or lysine-specific endopeptidase.

In another preferred embodiment, the acidified milk product has a more smooth texture compared to an acidified milk product prepared by the same process but without treating with a trypsin-like or lysine-specific endopeptidase, where the texture is visually evaluated by placing a sample of the acidified milk product on the backside of a black plastic spoon; and the viscosity of the acidified milk product is at most 25% reduced compared to an acidified milk product prepared by the same process but without treating with a trypsin-like or lysine-specific endopeptidase, where the viscosity is determined by allowing the acidified milk product to set for 1 hour at 4° C. followed by viscosity measurement at 25° C. at 50 rpm during 70 seconds.

In another preferred embodiment, the acidified milk product has a more smooth texture compared to an acidified milk product prepared by the same process but without treating with a trypsin-like or lysine-specific endopeptidase, where the texture is visually evaluated by placing a sample of the acidified milk product on the backside of a black plastic spoon; and the acidified milk product after 16 days storage at 4° C. has expelled at most 10% more, preferably at most 5% more, whey compared to an acidified milk product prepared by the same process but without treating with a trypsin-like or lysine-specific endopeptidase; or, if an acidified milk product prepared by the same process but without treating with a trypsin-like or lysine-specific endopeptidase has expelled zero whey after 16 days storage at 4° C., the acidified milk product obtained after steps (a) and (b) has expelled at most 1% whey, where the amount of expelled whey is calculated using the formula: (weight of yoghurt sample−weight of solid phase)/(weight of yoghurt sample)*100%.

In another preferred embodiment, the viscosity of the acidified milk product is at most 25% reduced compared to an acidified milk product prepared by the same process but without treating with a trypsin-like or lysine-specific endopeptidase, where the viscosity is determined by allowing the acidified milk product to set for 1 hour at 4° C. followed by viscosity measurement at 25° C. at 50 rpm during 70 seconds; and the acidified milk product after 16 days storage at 4° C. has expelled at most 10% more, preferably at most 5% more, whey compared to an acidified milk product prepared by the same process but without treating with a trypsin-like or lysine-specific endopeptidase; or, if an acidified milk product prepared by the same process but without treating with a trypsin-like or lysine-specific endopeptidase has expelled zero whey after 16 days storage at 4° C., the acidified milk product obtained after steps (a) and (b) has expelled at most 1% whey, where the amount of expelled whey is calculated using the formula: (weight of yoghurt sample−weight of solid phase)/(weight of yoghurt sample)*100%.

In another preferred embodiment, the acidified milk product has a more smooth texture compared to an acidified milk product prepared by the same process but without treating with a trypsin-like or lysine-specific endopeptidase, where the texture is visually evaluated by placing a sample of the acidified milk product on the backside of a black plastic spoon; and the viscosity of the acidified milk product is at most 25% reduced compared to an acidified milk product prepared by the same process but without treating with a trypsin-like or lysine-specific endopeptidase, where the viscosity is determined by allowing the acidified milk product to set for 1 hour at 4° C. followed by viscosity measurement at 25° C. at 50 rpm during 70 seconds; and the acidified milk product after 16 days storage at 4° C. has expelled at most 10% more, preferably at most 5% more, whey compared to an acidified milk product prepared by the same process but without treating with a trypsin-like or lysine-specific endopeptidase; or, if an acidified milk product prepared by the same process but without treating with a trypsin-like or lysine-specific endopeptidase has expelled zero whey after 16 days storage at 4° C., the acidified milk product obtained after steps (a) and (b) has expelled at most 1% whey, where the amount of expelled whey is calculated using the formula: (weight of yoghurt sample−weight of solid phase)/(weight of yoghurt sample)*100%.

Trypsin-Like or Lysine-Specific Endopeptidase

In the process of the invention, a milk substrate is treated with a trypsin-like or lysine-specific endopeptidase.

In the context of the present invention, a trypsin-like endopeptidase is an endopeptidase which specifically cleaves on the carboxy terminal side of arginine and/or lysine. I.e., it specifically cleaves on the carboxy terminal side of arginine or lysine or both. In a preferred embodiment, the trypsin-like endopeptidase specifically cleaves on the carboxy terminal side of arginine and lysine.

In the context of the present invention, a lysine-specific endopeptidase is an endopeptidase which specifically cleaves on the carboxy terminal side of lysine. A lysine-specific endopeptidase may also be termed a lysyl-specific endopeptidase.

Preferably, the trypsin-like or lysine-specific endopeptidase has a specificity for cleaving after Arg or Lys (whichever is the larger) which is at least 100-fold higher than its specificity for cleaving after any one of Ala, Asp, Glu, Ile, Leu, Met, Phe, Tyr or Val (whichever is the larger).

In an embodiment, the trypsin-like or lysine-specific endopeptidase has a specificity for cleaving after Arg or Lys (whichever is the larger) which is at least 10-fold, such as at least 20-fold or at least 50-fold, higher than its specificity for cleaving after any one of Ala, Asp, Glu, Ile, Leu, Met, Phe, Tyr or Val (whichever is the larger). In another embodiment, the trypsin-like or lysine-specific endopeptidase has a specificity for cleaving after Arg or Lys (whichever is the larger) which is at least 200-fold, such as at least 500-fold or at least 1000-fold, higher than its specificity for cleaving after any one of Ala, Asp, Glu, Ile, Leu, Met, Phe, Tyr or Val (whichever is the larger)."

Preferably, such determination of specificities should be performed at a pH-value where the activity of the endopeptidase is at least half of the activity of the endopeptidase at its pH optimum. Preferably, any such relative specificities are to be determined using Suc-AAP-X-pNA substrates as described in Example 3 of WO 2008/125685 which is incorporated by reference.

Preferably, a trypsin-like endopeptidase to be used in the process of the invention is classified in EC 3.4.21.4.

Preferably, a lysine-specific endopeptidase to be used in the process of the invention is classified in EC 3.4.21.50

Any trypsin-like or lysine-specific endopeptidase can be used in the process of the invention. The origin of the enzyme is not important for a successful outcome.

The trypsin-like or lysine-specific endopeptidase to be used in the process of the invention may be derived from any source. It may be derived from an animal, e.g., it may be a porcine or a bovine trypsin. Such porcine or bovine trypsin may have been extracted, e.g., from porcine or bovine pancreas, or it may have been expressed in a microorganism, such as in a filamentous fungus or yeast, or in a bacterium.

The trypsin-like or lysine-specific endopeptidase to be used in the process of the invention may be derived from a microorganism, such as from a filamentous fungus or yeast, or from a bacterium.

The endopeptidase may, e.g., be derived from a strain of *Agaricus*, e.g. *A. bisporus*; *Ascovaginospora*; *Aspergillus*, e.g. *A. niger, A. awamori, A. foetidus, A. japonicus, A. oryzae*; *Candida*; *Chaetomium*; *Chaetotomastia*; *Dictyostelium*, e.g. *D. discoideum*; *Fusarium*, e.g. *F. oxysporum, F. solani*, F. sp.; *Kluveromyces*, e.g. *K. fragilis, K. lactis*; *Mucor*, e.g. *M. javanicus, M. mucedo, M. subtilissimus*; *Neurospora*, e.g. *N. crassa*; *Rhinocladiella*; *Rhizomucor*, e.g. *R. pusillus*; *Rhizopus*, e.g. *R. arrhizus, R. japonicus, R. stolonifer*; *Sclerotinia*, e.g. *S. libertiana*; *Torula*; *Torulopsis*; *Trichoderma*, e.g. *T. reesei*; *Trichophyton*, e.g. *T. rubrum*; *Whetzelinia*, e.g. *W. sclerotiorum*; *Actinosynnema*, e.g. *A. mirum*; *Bacillus*, e.g. B. sp. *B. coagulans, B. circulans, B. megaterium, B. novalis, B. subtilis, B. pumilus, B. stearothermophilus, B. thuringiensis*; *Bifidobacterium*, e.g. *B. animalis, B. bifidum, B. breve, B. infantis, B. lactis, B. longum*; *Chryseobacterium*; *Citrobacter*, e.g. *C. freundii*; *Clostridium*, e.g. *C. perfringens*; *Diplodia*, e.g. *D. gossypina*; *Enterobacter*, e.g. *E. aerogenes, E. cloacae Edwardsiella, E. tarda*; *Erwinia*, e.g. *E. herbicola*; *Escherichia*, e.g. *E. coli*; *Klebsiella*, e.g. *K. pneumoniae*; *Kribbella*, e.g., *K. flavida*; *Kutzneria*, e.g., *K. albida*; *Miriococcum*; *Myrothesium*; *Mucor*; *Neurospora*, e.g. *N. crassa*; *Proteus*, e.g. *P. vulgaris*; *Providencia*, e.g. *P. stuartii*; *Pycnoporus*, e.g. *Pycnoporus cinnabarinus, Pycnoporus sanguineus*; *Ruminococcus*, e.g. *R. torques*; *Salmonella*, e.g. *S. typhimurium*; *Serratia*, e.g. *S. liquefasciens, S. marcescens*; *Shewanella*, e.g. *S. woodyi*; *Shigella*, e.g. *S. flexneri*; *Streptomyces*, e.g. *S. antibioticus, S. castaneoglobisporus, S. violeceoruber*; *Trametes*; *Trichoderma*, e.g. *T. reesei, T. viride*; *Yersinia*, e.g. *Y. enterocolitica*.

In a preferred embodiment, the endopeptidase is derived from a fungus. In another preferred embodiment, the endopeptidase is derived from a bacterium.

In a preferred embodiment, the trypsin-like endopeptidase is derived from a strain of *Fusarium*, preferably *Fusarium oxysporum*, e.g. having the amino acid sequence shown as SEQ ID NO: 1 of the present application (SWISSPROT No. P35049) or having an amino acid sequence which is at least 50%, such as at least 60%, at least 70%, at least 80%, at least 90%, at least 95%, at least 98%, at least 99%, or 100% identical to SEQ ID NO: 1.

In a preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to any of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11 or SEQ ID NO: 12 of the present application.

In a more preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to any of SEQ ID NO: 1, SEQ ID NO: 2, SEQ ID NO: 3, SEQ ID NO: 4, SEQ ID NO: 5, SEQ ID NO: 6 or SEQ ID NO: 12 of the present application.

In an even more preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to any of SEQ ID NO: 1, SEQ ID NO: 2, SEQ ID NO: 3, SEQ ID NO: 4 or SEQ ID NO: 12 of the present application.

In another preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to any of SEQ ID NO: 1 or SEQ ID NO: 12 of the present application.

In a most preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 1 of the present application.

In another preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 2 of the present application.

In another preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 3 of the present application.

In another preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 4 of the present application.

In another preferred embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 12 of the present application.

In another embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 5 of the present application.

In another embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 6 of the present application.

In another embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 7 of the present application.

In another embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 8 of the present application.

In another embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 9 of the present application.

In another embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 10 of the present application.

In another embodiment, the trypsin-like endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 11 of the present application.

In a preferred embodiment, the lysine-specific endopeptidase is derived from a strain of *Achromobacter*, preferably *Achromobacter lyticus*, e.g. having the amino acid sequence shown as SEQ ID NO: 15 of the present application or having an amino acid sequence which is at least 50%, such as at least 60%, at least 70%, at least 80%, at least 90%, at least 95%, at least 98%, at least 99%, or 100% identical to SEQ ID NO: 15.

In a most preferred embodiment, the lysine-specific endopeptidase to be used in the process of the invention has an amino acid sequence which is at least 50%, such as at least 60%, at least 70%, at least 80%, at least 90%, at least 95%, at least 98%, at least 99%, or 100% identical to SEQ ID NO: 15 of the present application.

In a preferred embodiment, the trypsin-like or lysine-specific endopeptidase to be used in the process of the invention has an amino acid sequence which is at least 50%, such as at least 60%, at least 70%, at least 80%, at least 90%, at least 95%, at least 98%, at least 99%, or 100% identical to any of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12 or SEQ ID NO: 15 of the present application.

In another preferred embodiment, the trypsin-like of lysine-specific endopeptidase to be used in the process of the invention has an amino acid sequence which is at least 50%, such as at least 60%, at least 70%, at least 80%, at least 90%, at least 95%, at least 98%, at least 99%, or 100% identical to any of SEQ ID NO: 1, SEQ ID NO: 12 or SEQ ID NO: 15 of the present application.

For purposes of the present invention, the sequence identity between two amino acid sequences is determined as the output of "longest identity" using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 6.6.0 or later. The parameters used are a gap open penalty of 10, a gap extension penalty of 0.5, and the EBLOSUM62 (EMBOSS version of BLOSUM62) substitution matrix. In order for the Needle program to report the longest identity, the -nobrief option must be specified in the command line. The output of Needle labeled "longest identity" is calculated as follows:

$$(\text{Identical Residues} \times 100)/(\text{Length of Alignment} - \text{Total Number of Gaps in Alignment})$$

The trypsin-like or lysine-specific endopeptidase may be extracellular. It may have a signal sequence at its N-terminus, which is cleaved off during secretion.

The trypsin-like or lysine-specific endopeptidase may be derived from any of the sources mentioned herein. The term "derived" means in this context that the enzyme may have been isolated from an organism where it is present natively, i.e. the amino acid sequence of the endopeptidase is identical to a native polypeptide. The term "derived" also means that the enzyme may have been produced recombinantly in a host organism, the recombinantly produced enzyme having either an amino acid sequence which is identical to a native enzyme or having a modified amino acid sequence, e.g. having one or more amino acids which are deleted, inserted and/or substituted, i.e. a recombinantly produced enzyme which is a mutant of a native amino acid sequence. Within the meaning of a native enzyme are included natural variants. Furthermore, the term "derived" includes enzymes produced synthetically by, e.g., peptide synthesis. The term "derived" also encompasses enzymes which have been modified e.g. by glycosylation, phosphorylation etc., whether in vivo or in vitro. With respect to recombinantly produced enzymes the term "derived from" refers to the identity of the enzyme and not the identity of the host organism in which it is produced recombinantly.

The trypsin-like or lysine-specific endopeptidase may be obtained from a microorganism by use of any suitable technique. For instance, an enzyme preparation may be obtained by fermentation of a suitable microorganism and subsequent isolation of an endopeptidase preparation from the resulting fermented broth or microorganism by methods known in the art. The trypsin-like or lysine-specific endopeptidase may also be obtained by use of recombinant DNA techniques. Such method normally comprises cultivation of a host cell transformed with a recombinant DNA vector comprising a DNA sequence encoding the trypsin-like or lysine-specific endopeptidase and the DNA sequence being operationally linked with an appropriate expression signal such that it is capable of expressing the enzyme in a culture medium under conditions permitting the expression of the enzyme and recovering the enzyme from the culture. The DNA sequence may also be incorporated into the genome of the host cell. The DNA sequence may be of genomic, cDNA or synthetic origin or any combinations of these, and may be isolated or synthesized in accordance with methods known in the art.

The trypsin-like or lysine-specific endopeptidase may be purified. The term "purified" as used herein covers trypsin-like or lysine-specific endopeptidase enzyme protein essentially free from insoluble components from the production organism. The term "purified" also covers trypsin-like or lysine-specific endopeptidase enzyme protein essentially free from insoluble components from the native organism from which it is obtained. Preferably, it is also separated from some of the soluble components of the organism and culture medium from which it is derived. More preferably, it is separated by one or more of the unit operations: filtration, precipitation, or chromatography.

Preferably, the trypsin-like or lysine-specific endopeptidase is purified from its production organism. More preferably, the trypsin-like or lysine-specific endopeptidase is purified from its production organism meaning that the trypsin-like or lysine-specific endopeptidase preparation does not comprise living production organism cells.

Accordingly, the trypsin-like or lysine-specific endopeptidase may be purified, viz. only minor amounts of other proteins being present. The expression "other proteins" relate in particular to other enzymes. The term "purified" as used herein also refers to removal of other components, particularly other proteins and most particularly other enzymes present in the cell of origin of the trypsin-like or lysine-specific endopeptidase. The trypsin-like or lysine-specific endopeptidase may be "substantially pure", i.e. free from other components from the organism in which it is produced, i.e., e.g., a host organism for recombinantly produced trypsin-like or lysine-specific endopeptidase. Preferably, the trypsin-like or lysine-specific endopeptidase is an at least 40% (w/w) pure enzyme protein preparation, more preferably at least 50%, 60%, 70%, 80% or even at least 90% pure.

The term trypsin-like or lysine-specific endopeptidase includes whatever auxiliary compounds may be necessary for the enzyme's catalytic activity, such as, e.g., an appropriate acceptor or cofactor, which may or may not be naturally present in the reaction system.

The trypsin-like or lysine-specific endopeptidase may be in any form suited for the use in question, such as, e.g., in the form of a dry powder or granulate, a non-dusting granulate, a liquid, a stabilized liquid, or a protected enzyme.

The trypsin-like or lysine-specific endopeptidase may be added at a concentration of 0.1-10 microgram enzyme protein per g milk protein, preferably 0.5-5 microgram enzyme protein per g milk protein, more preferably 1-5 microgram enzyme protein per g milk protein or 3-5 microgram enzyme protein per g milk protein.

The dosage will depend on parameters such as the temperature, the incubation time and the yoghurt recipe. The skilled person will know how to determine the optimal enzyme dosage.

According to the present invention, trypsin-like endopeptidase activity may be determined by any method known in the art. Also, lysine-specific endopeptidase activity may be determined by any method known in the art.

Trypsin-like and lysine-specific endoproteases hydrolyse the chromophoric substrates Ac-Arg-p-nitro-anilide (Ac-Arg-pNA) and/or Ac-Lys-p-nitro-anilide (Ac-Arg-pNA). The liberated pNA produces an absorption increase at 405 nm, which is proportional to enzyme activity. One KMTU is relative to the amount of enzyme that produces 1 micromole p-nitroaniline per minute, when Ac-Arg-pNA or Ac-Lys-pNA is incubated with the enzyme at pH 8.0 at 37° C. The activity may be determined relative to a porcine pancreatic trypsin standard of declared strength.

Transglutaminase

In the process of the invention, a milk substrate is treated with a transglutaminase.

The transglutaminase to be used in the methods of the invention may be obtained from any source, in particular from a filamentous fungus or yeast, or from a bacterium.

The transglutaminase may, e.g., be derived from a strain of *Agaricus*, e.g. *A. bisporus*; *Ascovaginospora*; *Aspergillus*, e.g. *A. niger*, *A. awamori*, *A. foetidus*, *A. japonicus*, *A. oryzae*; *Candida*; *Chaetomium*; *Chaetotomastia*; *Dictyostelium*, e.g. *D. discoideum*; *Fusarium*, e.g. *F. oxysporum*, *F. solani*, *F.* sp.; *Kluveromyces*, e.g. *K. fragilis*, *K. lactis*; *Mucor*, e.g. *M. javanicus*, *M. mucedo*, *M. subtilissimus*; *Neurospora*, e.g. *N. crassa*; *Rhinocladiella*; *Rhizomucor*, e.g. *R. pusillus*; *Rhizopus*, e.g. *R. arrhizus*, *R. japonicus*, *R. stolonifer*; *Sclerotinia*, e.g. *S. libertiana*; *Torula*; *Torulopsis*; *Trichoderma*, e.g. *T. reesei*; *Trichophyton*, e.g. *T. rubrum*; *Whetzelinia*, e.g. *W. sclerotiorum*; *Actinosynnema*, e.g. *A. mirum*; *Bacillus*, e.g. *B.* sp. *B. coagulans*, *B. circulans*, *B. megaterium*, *B. novalis*, *B. subtilis*, *B. pumilus*, *B. stearothermophilus*, *B. thuringiensis*; *Bifidobacterium*, e.g. *B. animalis*, *B. bifidum*, *B. breve*, *B. infantis*, *B. lactis*, *B. longum*; *Chryseobacterium*; *Citrobacter*, e.g. *C. freundii*;

*Clostridium*, e.g. *C. perfringens*; *Diplodia*, e.g. *D. gossypina*; *Enterobacter*, e.g. *E. aerogenes*, *E. cloacae Edwardsiella*, *E. tarda*; *Erwinia*, e.g. *E. herbicola*; *Escherichia*, e.g. *E. coli*; *Klebsiella*, e.g. *K. pneumoniae*; *Kribbella*, e.g., *K. flavida*; *Kutzneria*, e.g., *K. albida*; *Miriococcum*; *Myrothesium*; *Mucor*; *Neurospora*, e.g. *N. crassa*; *Proteus*, e.g. *P. vulgaris*; *Providencia*, e.g. *P. stuartii*; *Pycnoporus*, e.g. *Pycnoporus cinnabarinus*, *Pycnoporus sanguineus*; *Ruminococcus*, e.g. *R. torques*; *Salmonella*, e.g. *S. typhimurium*; *Serratia*, e.g. *S. liquefasciens*, *S. marcescens*; *Shewanella*, e.g. *S. woodyi*; *Shigella*, e.g. *S. flexneri*; *Streptomyces*, e.g. *S. antibioticus*, *S. castaneoglobisporus*, *S. violeceoruber*; *Trametes*; *Trichoderma*, e.g. *T. reesei*, *T. viride*; *Yersinia*, e.g. *Y. enterocolitica*.

In a preferred embodiment, the transglutaminase is derived from a fungus. In another preferred embodiment, the transglutaminase is derived from a bacterium.

In a preferred embodiment, the transglutaminase is derived from a strain of *Streptomyces*, preferably *S. mobaraensis* or *S. lydicus*, more preferably *S. mobaraensis*.

In a preferred embodiment, the transglutaminase to be used in a method of the invention has an amino acid sequence which is at least 50%, such as at least 60%, at least 70%, at least 80%, at least 90%, at least 95%, at least 98%, at least 99%, or 100% identical to SEQ ID NO: 13 or SEQ ID NO: 14 of the present application or a transglutaminase active fragment hereof.

In a preferred embodiment, the transglutaminase to be used in a method of the invention has an amino acid sequence which is at least 50%, such as at least 60%, at least 70%, at least 80%, at least 90%, at least 95%, at least 98%, at least 99%, or 100% identical to the mature polypeptide of SEQ ID NO: 13 or SEQ ID NO: 14.

In a more preferred embodiment, the transglutaminase to be used in a method of the invention has an amino acid sequence which is at least 50%, such as at least 60%, at least 70%, at least 80%, at least 90%, at least 95%, at least 98%, at least 99%, or 100% identical to SEQ ID NO: 13.

The transglutaminase may be extracellular. It may have a signal sequence at its N-terminus, which is cleaved off during secretion.

The transglutaminase may be obtained from a microorganism by use of any suitable technique. For instance, an enzyme preparation may be obtained by fermentation of a suitable microorganism and subsequent isolation of a transglutaminase preparation from the resulting fermented broth or microorganism by methods known in the art. The transglutaminase may also be obtained by use of recombinant DNA techniques. Such method normally comprises cultivation of a host cell transformed with a recombinant DNA vector comprising a DNA sequence encoding the transglutaminase and the DNA sequence being operationally linked with an appropriate expression signal such that it is capable of expressing the enzyme in a culture medium under conditions permitting the expression of the enzyme and recovering the enzyme from the culture. The DNA sequence may also be incorporated into the genome of the host cell. The DNA sequence may be of genomic, cDNA or synthetic origin or any combinations of these, and may be isolated or synthesized in accordance with methods known in the art.

The transglutaminase may be purified. The term "purified" as used herein covers transglutaminase enzyme protein essentially free from insoluble components from the production organism. The term "purified" also covers transglutaminase enzyme protein essentially free from insoluble components from the native organism from which it is obtained. Preferably, it is also separated from some of the soluble components of the organism and culture medium from which it is derived. More preferably, it is separated by one or more of the unit operations: filtration, precipitation, or chromatography.

Preferably, the transglutaminase is purified from its production organism. More preferably, the transglutaminase is purified from its production organism meaning that the transglutaminase preparation does not comprise living production organism cells.

Accordingly, the transglutaminase may be purified, viz. only minor amounts of other proteins being present. The expression "other proteins" relate in particular to other enzymes. The term "purified" as used herein also refers to removal of other components, particularly other proteins and most particularly other enzymes present in the cell of origin of the transglutaminase. The transglutaminase may be "substantially pure", i.e. free from other components from the organism in which it is produced, i.e., e.g., a host organism for recombinantly produced transglutaminase. Preferably, the transglutaminase is an at least 40% (w/w) pure enzyme protein preparation, more preferably at least 50%, 60%, 70%, 80% or even at least 90% pure.

The term transglutaminase includes whatever auxiliary compounds may be necessary for the enzyme's catalytic activity, such as, e.g., an appropriate acceptor or cofactor, which may or may not be naturally present in the reaction system.

The transglutaminase may be in any form suited for the use in question, such as, e.g., in the form of a dry powder or granulate, a non-dusting granulate, a liquid, a stabilized liquid, or a protected enzyme.

The transglutaminase may be added at a concentration of 0.1-5 TGHU(A)/g milk protein, preferably 0.2-1 TGHU (A)/g milk protein. The dosage will depend on parameters such as the temperature and the incubation time. The skilled person will know how to determine the optimal enzyme dosage.

According to the present invention, transglutaminase activity may be determined by any method known in the art. For example, analysis of transglutaminase activity may be done by quantitation of the released ammonia resulting from the formation of an isopeptide bond between a free amino group (6-aminohexanoic acid) and an acyl group from a glutamine (Z-GLN-GLY) like described below:

Chemicals and Enzymes Used:
  Z-GLN-GLY. Eg. Sigma C6154
  6-aminohexanoic acid. Eg. Sigma 07260
  L-Gluthathione reduced. Eg. Sigma G4251
  α-Ketoglutarate. Eg. Sigma K3752
  NADH
  L-GLDH. Eg. Roche 107735
  MOPS. Eg. Sigma M-1254
Transglutaminase Standard
Method:

To 75 myl of an enzyme solution, dissolved in 0.1 M MOPS/5 mM L-Gluthathione reduced pH 7.0, is added 50 myl of 1% 6-aminohexanoic acid, and 75 myl of 1% Z-GLN-GLY, and 75 myl of (0.44 g/L NADH, 2.5 g/L α-Ketoglutarate in 0.1 M MOPS pH 7.0).

The absorbance at 340 nm is followed by kinetic measurement for 5 min at 30° C.

The enzyme activity is determined relative to a transglutaminase standard that has been aligned to match the transglutaminase Unit Definition (Folk, J. E. and Cole, P. W. (1966) Biochim. Biophys. Acta. 241, 5518-5525). Result expressed as TGHU(A).

EXAMPLES

Methods
Viscosity Measurement

Viscosity was measured using Rapid Visco Analyzer (RVA) 4500 (Perten Instruments, Sweden). 30 g yoghurt sample is transferred in RVA cup and allowed to set in the refrigerator for 1 h before the measurement. The measurement is carried out at 25° C. at 50 rpm, during 130 sec. For simplicity the viscosity reading after 70 seconds is presented.

Evaluation of Spontaneous Syneresis 50 g fresh yoghurt sample is transferred in a 50 ml NUNC centrifuge tube and stored refrigerated for 16 days. The free whey separated on top of the yoghurts upon storage is weighed out, and the amount is expressed as % of yoghurt weight.

Forced Syneresis Test 30 g of yoghurt sample is centrifugated for 15 min @ 3500 rpm (=2643×g) and the weight of remaining solid is recorded after removal of supernatant (whey). Amount of expelled whey is calculated using the formula: (Weight of yoghurt sample–weight of solid phase)/(weight of yoghurt sample)*100%.

Visual Evaluation of Texture

The visual appearance of the yoghurt samples is evaluated by placing yoghurt sample on the back side of black plastic spoons, where lumps or graininess and runny/thin texture are easily observed.

Sensory Evaluation

Sensory evaluation is carried out by 6 assessors that have participated in a basic sensory screening and are familiarized with evaluation of yoghurt texture. Samples are anonymized by 3-digit codes. The yoghurts are evaluated in a rating test where assessors rate yoghurts on visual and oral parameters on a scale 1-7. The parameters are: Visual: grainy/flaky appearance, glossiness, thickness, syneresis; Oral: mouth thickness, stickiness to teeth, bitter taste and sandy/gritty mouthfeel.

Example 1

Stirred Lowfat Yoghurt Using a Combination of Transglutaminase and Various Endoproteases The objective of this example was to compare the taste and texture of stirred yoghurts produced using a combination of transglutaminase and various endoproteases.

Production of Lowfat Stirred Yoghurt in Laboratory Scale

Low pasteurized skimmed milk with 0.5% fat content was purchased from local supermarket and used for yoghurt production without further standardization. The milk was aliquoted in 100 g portions and pasteurized at 90° C. for 5 minutes and subsequently cooled to acidification temperature 43° C. Starter culture (Lyofast Y450B, Sacco, Italy) and enzymes were added to the milk and acidification was carried out at 43° C. for 4-5 hours, until the pH had reached 4.5. Transglutaminase and endoproteases were added at the same time immediately after starter culture. The dosing of endoproteases was based on initial dose-response tests, where enzyme impact on yoghurt appearance and viscosity upon different doses was investigated (results not shown). The dose resulting in smoothest product and higher viscosity vs. the untreated reference was selected for the current example.

NovoProD, Neutrase, Alcalase and Ronozym ProAct are endoproteases which are not trypsin-like or lysine-specific. They are classified in EC 3.4.21.62, 3.4.24.28, 3.4.21.62 and 3.4.21.1 respectively.

When the pH had decreased to the end value, the yoghurt gel was broken using a spoon and the yoghurts were subsequently mixed by using a shear mixer (Ultra Turrax, IKA, Germany) for 20 seconds at lowest speed. The yoghurt was transferred into plastic cups covered with a lid and stored refrigerated until evaluation. Viscosity measurement, visual and sensory evaluation were carried out after 6 days' storage, while syneresis was evaluated after 16 days' storage.

TABLE 1

Overview of enzyme treatments. The dosing was based on preliminary dose-response tests (results not shown)

| Sample ID | TG dose TGHU(A)/g milk protein | Endoprotease dose, μg EP/g milk protein |
|---|---|---|
| TG (SEQ ID NO 13) | 0.5 | 0 |
| TG + NovoProD | 0.5 | 3 |
| TG + TL1 (SEQ ID NO 1) | 0.5 | 3 |
| TG + Neutrase 0.8 L | 0.5 | 1 |
| TG + Alcalase 2.4 L FG | 0.5 | 3 |
| TG + Ronozym ProAct L | 0.5 | 3 |

Results and Discussion

The results are summarized in Table 2. The reference yoghurt prepared using transglutaminase alone had a slightly grainy/flaky appearance. Addition of endoproteases resulted in some degree of improvement in the appearance, except for Alcalase that resulted in a lumpy and more grainy texture. In particular the yoghurts prepared using a combination of TG and either TL1 or Neutrase were smooth without visible flakiness.

Transglutaminase is typically added in yoghurts to increase the viscosity, and improved smoothness should not be at the cost of compromised viscosity. Yoghurts prepared with a combination of TG and endoproteases in general showed slightly lower viscosity than the yoghurt with TG alone. However, from other laboratory scale trials (results not shown) it is known that the viscosity of lowfat stirred yoghurt produced in the described process but without addition of transglutaminase or endoprotease enzymes, is lower than the viscosities of any of the samples in this current trial. Yoghurt prepared using TL1 retained a higher viscosity compared to the yoghurt with Neutrase.

One of the advantages of using transglutaminase is the reduction of syneresis during storage. As seen from Table 2, no syneresis was observed in the reference yoghurt produced using transglutaminase alone. In contrast, 3 out of the 5 tested endoproteases resulted in some degree of whey separation during storage, which is not desired. Notably, TL1 did not result in syneresis, while yoghurt with Neutrase had significant syneresis.

FIG. 1 shows the results of sensory evaluation of the yoghurts. All endoproteases except Alcalase improved the appearance resulting in less grainy/flaky look and higher glossiness. Also, the mouthfeel was improved in terms of less stickiness to teeth and less sandiness/grittiness. Both visual thickness and mouth thickness were decreased to some degree, but yoghurts with TL1 and NovoProD were perceived relatively thicker compared to other endoprotease-treated yoghurts. None of the samples were perceived pronouncedly bitter, however yoghurts with Alcalase and Ronozym ProAct were perceived as having more bitter notes than the other yoghurts.

TABLE 2

Visual appearance and viscosity of yoghurts evaluated after 6 days' storage, and syneresis measured after 16 days' storage.

| Sample ID | Visual appearance | Viscosity (cP) | Syneresis (% w/w) |
|---|---|---|---|
| TG (SEQ ID NO 13) | Grainy | 1471 | 0 |
| TG + NovoProD | Slightly grainy | 1169 | 0.4 |
| TG + TL1 (SEQ ID NO 1) | Smooth | 1128 | 0 |
| TG + Neutrase 0.8 L | Smooth | 1014 | 1.5 |
| TG + Alcalase 2.4 L FG | Lumpy and separated | 1295 | 0 |
| TG + Ronozym ProAct L | Smooth, only few small lumps | 1113 | 4.4 |

Conclusion

Combination of transglutaminase with endoprotease TL1 resulted in overall best texture and taste, evaluated by several parameters. The yoghurts prepared with TL1 had a smoother appearance than those prepared with most other endoproteases except for Neutrase, and TL1 caused no bitter off-taste. TL1 did not result in syneresis, while yoghurts with Neutrase developed significant syneresis during storage.

Example 2

Pilot Scale Production of Stirred Lowfat Yoghurt Using a Combination of Transglutaminase and TL1

The objective of this example was to show that the texture of lowfat yoghurt produced using a combination of transglutaminase and TL1 was smoother compared to yoghurt produced using transglutaminase alone.

Production of Lowfat Stirred Yoghurt in Pilot Scale

Raw bovine milk was obtained from local farm and standardized to 0.1% fat and 3.5% protein content. The milk was pasteurized at 95° C. for 5 minutes and cooled to acidification temperature 43° C. Starter culture (Lyofast Y450B, Sacco, Italy) and TG (SEQ ID NO 13) and endoprotease TL1 (SEQ ID NO 1) were added to the milk and acidification was carried out at 43° C. for 5-6 hours, until the pH had reached 4.5.

The yoghurt gels were first mixed manually to break the gel, and subsequently by using a shear mixer (Ytron-Z, Ytron Process Technology, Germany). The frequency was adjusted targeting the smoothest possible product. The used frequency for each sample is shown in Table 3. After high shear mixing the yoghurt was cooled in a tubular cooler to 20-22° C. and packed in 200 ml plastic cups sealed with a lid. Yoghurts were stored refrigerated until evaluation.

Viscosity measurement and forced syneresis test were carried out after 9-10 days, 14 days and 21 days storage. Sensory evaluation was carried out after 1 and 2 weeks storage.

TABLE 3

Overview of treatments included in the pilot study

| Sample ID | TG dose TGHU(A)/g milk protein | TL1 dose, µg EP/g protein | Ytron Frequency, Hz |
|---|---|---|---|
| Reference | 0 | 0 | 20 |
| TG 0.4 | 0.4 | 0 | 38 |
| TG 0.6 | 0.6 | 0 | 55 |
| TG 0.5 + TL1 | 0.5 | 1 | 45 |
| TG 0.6 + TL1 | 0.6 | 1 | 55 |

Results and Discussion

Figure 2:
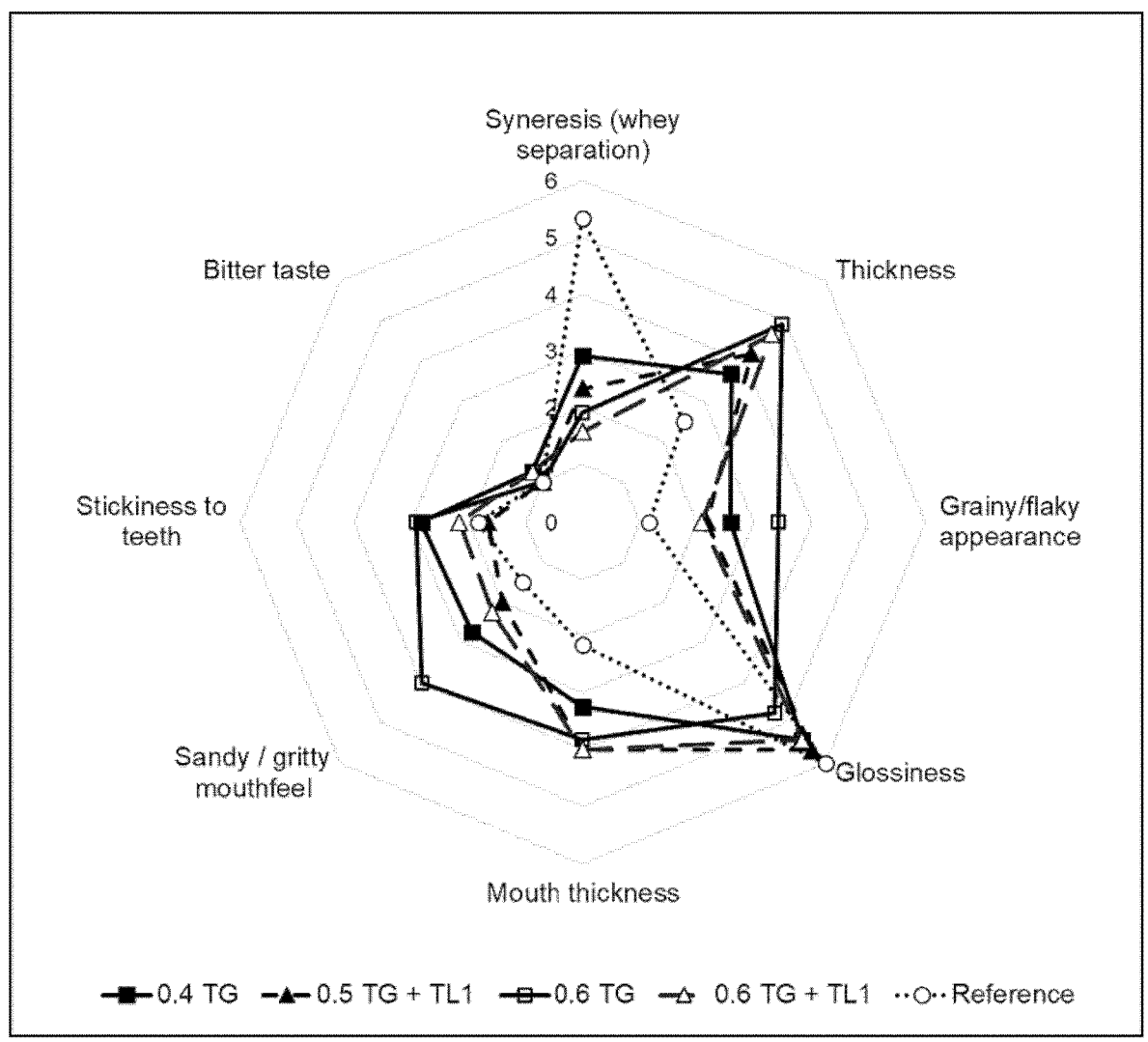
FIG. 2 shows the results of sensory evaluation of the yoghurts of Example 2.

FIG. 2 shows the results of sensory evaluation of the yoghurts after 2 weeks storage. The reference yoghurts had lowest thickness, both visually perceived and in the mouth, and showed most syneresis. At the same time, they were evaluated as being very glossy and smooth (low/no graininess or flakiness). On the other hand, the yoghurts treated with TG only were perceived clearly thicker and showing less syneresis, but also having a more grainy/flaky appearance and a more sandy/gritty mouthfeel. The extent of these texture defects was relative to the used enzyme dose. Applying TL1 endoprotease together with TG had a positive impact on the visual and oral texture characteristics. The appearance was rated less grainy/flaky compared with the yoghurt with TG only, and the sandy/gritty mouthfeel was reduced. At the same time, the viscosity was retained and syneresis was not enhanced. The yoghurts had a pleasant and not bitter taste.

The viscosities of yoghurt samples measured at 3 occasions during storage are shown in Table 4. It is evident from this data that all enzyme treated yoghurts have higher viscosity than the reference throughout the entire storage time. Also, it is seen that it is possible to obtain a similar degree of viscosity increase using a combination of TG and TL1 endoprotease, compared to TG alone, thus the endoprotease treatment does not compromise the thickness of the yoghurt.

The amount of whey expelled from the yoghurt upon centrifugation (forced syneresis) is a measure of the water holding capacity and correlates with the proneness to spontaneous syneresis occurring during storage. From the data presented in Table 5 it is seen that all enzyme treatments significantly reduced the forced syneresis, and that the combination of TL1 endoprotease with TG did not lead to more syneresis compared with the yoghurts where only TG was added.

Conclusion

Adding a combination of TG and TL1 endoprotease in yoghurt milk with 0.1% fat content during acidification resulted in yoghurts that were more viscous and had improved retention of whey compared to the untreated reference yoghurt. At the same time a smoother texture without flakiness was obtained, compared with yoghurts where only TG was added. The yoghurts had a good mouthfeel and pleasant taste without bitterness.

TABLE 4

Viscosity of yoghurt samples

| Sample ID | Reference | TG 0.4 | TG 0.6 | TG 0.5 + TL1 | TG 0.6 + TL1 |
|---|---|---|---|---|---|
| Day 9-10 | 1070 | 1612 | 1769 | 2005 | 1966 |
| Day 14 | 1053 | 1414 | 1599 | 1612 | 1740 |
| Day 21 | 898 | 1284 | 1460 | 1466 | 1666 |

TABLE 5

Forced syneresis of yoghurt samples: Expelled whey upon centrifugation, values shown are % w/w.

| Sample ID | Reference | TG 0.4 | TG 0.6 | TG 0.5 + TL1 | TG 0.6 + TL1 |
|---|---|---|---|---|---|
| Day 8-10 | 63 | 57 | 56 | n.a. | 57 |
| Day 14 | 66 | 58 | 56 | 56 | 57 |
| Day 21 | 70 | 60 | 57 | 58 | 55 |

Example 3

Stirred Whole Milk Yoghurt Using a Combination of Transglutaminase and TL1

The objective of this example was to show that a whole milk stirred yoghurt with smoother texture could be produced using a combination of transglutaminase and TL1, compared to transglutaminase alone.

Production of Whole Milk Stirred Yoghurt in Laboratory Scale

Low pasteurized whole milk with 3.5% fat content was purchased from local supermarket and used for yoghurt production without further standardization. The milk was aliquoted in 100 ml portions and pasteurized at 90° C. for 5 minutes and cooled to acidification temperature 43° C. Starter culture (Lyofast Y450B, Sacco, Italy) and transglutaminase (SEQ ID No 13) and TL1 (SEQ ID NO 1) were added to the milk and acidification was carried out at 43° C. for 4-5 hours, until the pH had reached 4.5. Two yoghurts with each treatment were produced (Table 6).

Then, the yoghurt gel was broken by using spoon and subsequently mixed using a shear mixer (Ultra Turrax) for 20 seconds at lowest speed. The yoghurt was transferred into plastic cups covered with a lid and stored refrigerated until evaluation. Viscosity, forced syneresis test and visual evaluation were carried out after 6 days' storage.

TABLE 6

| | | Enzyme dose | |
|---|---|---|---|
| Sample no | Sample ID | TG, TGHU(A)/g milk protein | TL1, µg EP/g protein |
| 1 | Control | 0 | 0 |
| 2 | TG 0.3 | 0.3 | 0 |
| 3 | TG 0.4 | 0.4 | 0 |
| 4 | TG 0.4 + TL1 | 0.4 | 1 |
| 5 | TG 0.5 | 0.5 | 0 |
| 6 | TG 0.5 + TL1 | 0.5 | 1 |

Results and Discussion

The control whole milk yoghurt without added enzyme had a smooth appearance but was also the thinnest of the test yoghurts, which is seen from the viscosities presented in table 7. Addition of TG at increasing doses increases the yoghurt viscosity but also gradually leads to a more grainy, flaky texture. Thus, the appearance of grainy texture defect sets a limit to the viscosity that can be achieved by using TG alone.

Yoghurts where a combination of TG and TL1 were added had a smooth appearance and at the same time they were thicker than the control yoghurts. Using a combination of TG at 0.5 TGHU(A)/g protein and TL1, similar viscosity was achieved as with TG at 0.4 TGHU(A)/g protein and without TL1, but the texture was clearly better in terms of smoothness.

Addition of TL1 together with transglutaminase at different concentrations did not have any significant impact on the retention of whey, as measured by the forced syneresis test (results in table 7).

TABLE 7

Visual appearance, viscosity and forced syneresis evaluated after 6 days' storage.

| Sample no | Sample ID | Visual appearance | Viscosity (cP) | Expelled whey upon centrifugation, % w/w |
|---|---|---|---|---|
| 1 | Control | Thinnest, smooth | 1531 | 50.9 |
| 2 | TG 0.3 | Thick, very slightly flaky | 2014 | 47.9 |
| 3 | TG 0.4 | Thick, slightly grainy/flaky | 2287 | 47.7 |
| 4 | TG 0.4 + TL1 | Thick, smooth | 1908 | 47.3 |
| 5 | TG 0.5 | Thick, grainy/flaky | 2618 | 48.3 |
| 6 | TG 0.5 + TL1 | Thick, smooth | 2276 | 48.2 |

Conclusion

Adding a combination of TG and TL1 endoprotease in yoghurt milk with 3.5% fat content during acidification resulted in yoghurts that were more viscous and had improved retention of whey compared to the untreated reference yoghurt. At the same time a smooth texture without flakiness was obtained.

Example 4

Addition of Transglutaminase and Protease Before Starter Culture in Stirred Lowfat Yoghurt The objective of this example was to show that a stirred yoghurt with smoother texture could be produced using a combination of transglutaminase and TL1, when enzymes are added before the starter culture.

Production of Stirred Yoghurt in Laboratory Scale

Low pasteurized skimmed milk with 0.5% fat content was purchased from local supermarket and used for yoghurt production without further standardization. The milk was aliquoted in 100 g portions and pasteurized at 90° C. for 5 minutes and subsequently cooled to acidification temperature 43° C. Transglutaminase (SEQ ID NO 13) and endoprotease TL1 (SEQ ID NO 1) were added into the milk and incubated for 1 or 2 hours, before addition of starter culture (Lyofast Y450B, Sacco, Italy). For reference, milk without enzymes was included in the trial. Also, samples where enzymes were added immediately after starter culture were included for comparison. Acidification was carried out at 43° C. for 4-5 hours, until the pH had reached 4.5.

When the pH had decreased to the end value, the yoghurt gel was broken using a spoon and the yoghurts were subsequently mixer by using a shear mixer (Ultra Turrax) for 20 seconds at lowest speed. The yoghurt was transferred into plastic cups covered with a lid and stored refrigerated until evaluation. Viscosity measurement, visual evaluation and forced syneresis test were carried out after 6 days' storage.

TABLE 8

Overview of enzyme treatments.

| Sample no | Sample ID | Enzyme dose | | Point of enzyme addition |
|---|---|---|---|---|
| | | TG, TGHU(A)/g milk protein | TL1, µg EP/g milk protein | |
| 1 | Control | 0 | 0 | n.a. |
| 2 | TG 0.3 (0 h) | 0.3 | 0 | Immediately after starter culture |
| 3 | TG 0.5 (0 h) | 0.5 | 0 | Immediately after starter culture |
| 4 | TG_0.5 + TL1 (0 h) | 0.5 | 1 | Immediately after starter culture |
| 5 | TG_0.3 (1 h) | 0.3 | 0 | 1 h before starter culture |
| 6 | TG_0.5 (1 h) | 0.5 | 0 | 1 h before starter culture |
| 7 | TG_0.5 + TL1 (1 h) | 0.5 | 1 | 1 h before starter culture |
| 8 | TG_0.3 (2 h) | 0.3 | 0 | 2 h before starter culture |
| 9 | TG_0.5 (2 h) | 0.5 | 0 | 2 h before starter culture |
| 10 | TG_0.5 + TL1 (2 h) | 0.5 | 1 | 2 h before starter culture |

Results and Discussion

The control yoghurt without added enzyme had a smooth appearance but was also the thinnest of the test yoghurts, which is seen from the viscosities presented in table 7. Addition of TG at 0.3 or 0.5 TGHU(A)/g increased the yoghurt viscosity compared to the untreated control yoghurt. The viscosity increase was higher when TG was added before starter culture, which was expected as the total reaction time for cross-binding was longer. At the same time the increased cross-binding led to more grainy and lumpy textures. When endoprotease TL1 was dosed together with TG, the resulting yoghurt textures were smoother compared to yoghurts with TG alone at same dose (0.5 TGHU(A)/g protein), or even compared to a lower TG dose (0.3 TGHU(A)/g protein). The improvement was observed for all tested points of addition, i.e. the yoghurts where enzymes were dosed 1 h or 2 h before starter culture, or immediately after starter culture.

syneresis. The improvement was achieved both when enzymes were added before starter cultures or immediately after, thus the impact was not limited to a specific point of enzyme addition.

Example 5

Lowfat Stirred Yoghurt Using a Combination of Transglutaminase and Porcine Trypsin or Lysine-Specific Protease from *Achromobacter lyticus*

The objective of this example was to show if porcine trypsin and lysine-specific protease from *Achromobacter lyticus* have the same effect as endoprotease TL1.

Production of Lowfat Stirred Yoghurt in Laboratory Scale

Low pasteurized skimmed milk with 0.5% fat content was purchased from local supermarket and used for yoghurt production without further standardization. The milk was aliquoted in 100 g portions and pasteurized at 95° C. for 5 minutes and subsequently cooled to acidification temperature 43° C. Starter culture (Lyofast Y450B, Sacco, Italy) and enzymes were added to the milk and acidification was

TABLE 9

Visual appearance, viscosity and forced syneresis evaluated after 6 days' storage.

| Sample no | Sample ID | Visual appearance | Viscosity (cP) | Expelled whey upon centrifugation, % w/w |
|---|---|---|---|---|
| 1 | Control | smooth, thin | 863 | 66.2 |
| 2 | TG 0.3 (0 h) | slightly grainy, thick | 1316 | 61.0 |
| 3 | TG 0.5 (0 h) | grainy/lumpy, thick | 1656 | 61.4 |
| 4 | TG_0.5 + TL1 (0 h) | smooth, thick | 1425 | 61.2 |
| 5 | TG_0.3 (1 h) | grainy, thick | 1463 | 58.9 |
| 6 | TG_0.5 (1 h) | grainy, very thick | 2135 | 56.1 |
| 7 | TG_0.5 + TL1 (1 h) | quite smooth with very slight graininess, thick | 1970 | 57.1 |
| 8 | TG_0.3 (2 h) | grainy, thick | 1729 | 56.9 |
| 9 | TG_0.5 (2 h) | very grainy and lumpy, thick | 2394 | 53.5 |
| 10 | TG_0.5 + TL1 (2 h) | quite smooth with very slight graininess, thick | 2263 | 57.0 |

Conclusion

A combination of endoprotease and transglutaminase led to improved texture compared with yoghurt where TG alone was added at comparative or lower dose. The yoghurts were smoother, while still retaining desired thickness and reduced carried out at 43° C. for 4-5 hours, until the pH had reached 4.5. Transglutaminase and endoprotease (either porcine trypsin (SEQ ID NO: 12) or lysine-specific protease from *Achromobacter lyticus* (ALP) (SEQ ID NO: 15)) were added at the same time immediately after starter culture. The endoprotease dosing was inspired by Example 1. The yoghurt production process and analysis such as viscosity and syneresis test were conducted according to the description in Example 1. The porcine trypsin was purified from a crude trypsin preparation prior to testing to remove chymotrypsin and other enzymatic activities.

TABLE 10

Overview of enzyme treatments.

| Sample ID | TG dose TGHU(A)/g milk protein | Endoprotease dose, µg EP/g milk protein |
|---|---|---|
| TG (SEQ ID NO 13) | 0.5 | 0 |
| TG + porcine trypsin 1 | 0.5 | 1 |
| TG + porcine trypsin 2 | 0.5 | 2 |
| TG + porcine trypsin 3 | 0.5 | 3 |
| TG + ALP 1 | 0.5 | 0.5 |
| TG + ALP 2 | 0.5 | 1 |
| TG + ALP 3 | 0.5 | 3 |

TABLE 11

Visual appearance, viscosity and forced syneresis of yoghurts evaluated after 6 days' storage, and syneresis measured after 9 days' storage

| Sample ID | Visual appearance | Viscosity, (cP) | Forced syneresis test (% free whey) | Syneresis (% w/w) |
|---|---|---|---|---|
| TG | Grainy | 1315 | 63 | 0 |
| TG + porcine trypsin 1 | Slightly grainy | 1281 | 65 | 0 |
| TG + porcine trypsin 2 | Almost smooth | 1167 | 66 | 0.5 |
| TG + porcine trypsin 3 | Smooth | 1037 | 68 | 0.9 |
| TG + ALP 1 | Slightly grainy | 1333 | 63 | 0.1 |
| TG + ALP 2 | Almost smooth | 1359 | 64 | 0 |
| TG + ALP 3 | Smooth | 1328 | 65 | 0 |

Results and Discussion

The results are summarized in Table 11. The TG treated yoghurt was grainy while all the protease+TG treated samples were less grainy. The dose response of the porcine trypsin+TG and the dose response of ALP+TG resulted in a gradual improvement of the graininess until a smooth yoghurt was produced at the highest dose. The ALP+TG sample at the highest dosage resulted in a smooth yoghurt but without compromising on the texture built by the transglutaminase as measured by viscosity. Overall the TG+ALP 3 sample was the best yoghurt of all the tested combinations.

The invention claimed is:

1. A process for preparing a spoonable or drinkable acidified milk product, wherein the spoonable or drinkable acidified milk product is yoghurt, set-type yoghurt, stirred yoghurt, strained yoghurt, drinking yoghurt, kefir, or buttermilk, wherein the process comprises the steps of:
(a) treating a milk substrate with a transglutaminase and a trypsin-like or lysine-specific endopeptidase; and
(b) acidifying the milk substrate by incubating with glucono delta-lactone (GDL) and/or a lactic acid bacterium to produce the acidified milk product;
wherein the step (a) is performed before or during the step (b).

2. The process according to claim 1 wherein the trypsin-like or lysine-specific endopeptidase has a specificity for cleaving after Arg or Lys (whichever is the larger) which is at least 100-fold higher than its specificity for cleaving after any one of Ala, Asp, Glu, Ile, Leu, Met, Phe, Tyr or Val (whichever is the larger).

3. The process according to claim 1, wherein the trypsin-like or lysine-specific endopeptidase is selected from the group consisting of
a polypeptide having an amino acid sequence which has at least 80% sequence identity to any of SEQ ID NOs: 1, 2, 3, 4, 5, 6, 7, 8, 9, 10, 11, 12 or 15.

4. The process according to claim 1, wherein the trypsin-like or lysine-specific endopeptidase is selected from the group consisting of
a polypeptide having an amino acid sequence which has at least 80% sequence identity to any of SEQ ID NOs: 1, 12 or 15.

5. The process according to claim 1, wherein the trypsin-like endopeptidase is a fungal endopeptidase derived from *Fusarium* and/or the lysine-specific endopeptidase is derived from a strain of *Achromobacter*.

6. The process according to claim 1, wherein the transglutaminase is selected from the group consisting of
a polypeptide having an amino acid sequence which has at least 80% sequence identity to any of SEQ ID NOs: 13 or 14.

7. The process according to claim 1, wherein the transglutaminase is a bacterial endopeptidase derived from *Streptomyces*.

8. The process according to claim 1, wherein pasteurization is performed before the step (b).

9. The process according to claim 1, wherein the step (a) and the step (b) are performed simultaneously.

10. The process according to claim 1, wherein acidification is performed by incubating with a lactic acid bacterium.

11. The process according to claim 1, wherein
a. viscosity of the spoonable or drinkable acidified milk product is at most 25% reduced compared to the viscosity of a spoonable or drinkable acidified milk product prepared by the same process but without treating with a trypsin-like or lysine-specific endopeptidase, where the viscosity is determined by allowing the spoonable or drinkable acidified milk product to set for 1 hour at 4° C. followed by viscosity measurement at 25° C. at 50 rpm during 70 seconds; and/or
b. the spoonable or drinkable acidified milk product after 16 days storage at 4° C. has expelled at most 10% more whey compared to a spoonable or drinkable acidified milk product prepared by the same process but without treating with a trypsin-like or lysine-specific endopeptidase; or, if a spoonable or drinkable acidified milk product prepared by the same process but without treating with a trypsin-like or lysine-specific endopeptidase has expelled zero whey after 16 days storage at 4° C., the spoonable or drinkable acidified milk product obtained after the steps (a) and (b) has expelled at most 1% whey; where the amount of expelled whey is calculated using the formula: (weight of yoghurt sample−weight of solid phase)/(weight of yoghurt sample)*100%.

12. A spoonable or drinkable acidified milk product prepared by the process according to claim 1, wherein the spoonable or drinkable acidified milk product is yoghurt, set-type yoghurt, stirred yoghurt, strained yoghurt, drinking yoghurt, kefir, or buttermilk.

13. The process according to claim 1, wherein the trypsin-like or lysine-specific endopeptidase is selected from the group consisting of a polypeptide having an amino acid sequence which has at least 90% sequence identity to any of SEQ ID NOs: 1, 2, 3, 4, 5, 6, 7, 8, 9, 10, 11, 12 or 15.

14. The process according to claim 1, wherein the trypsin-like or lysine-specific endopeptidase is selected from the group consisting of a polypeptide having an amino acid sequence which has at least 95% sequence identity to any of SEQ ID NOs: 1, 2, 3, 4, 5, 6, 7, 8, 9, 10, 11, 12 or 15.

15. The process according to claim 1, wherein the trypsin-like or lysine-specific endopeptidase is selected from the group consisting of a polypeptide having an amino acid sequence which has at least 90% sequence identity to any of SEQ ID NOs: 1, 12 or 15.

16. The process according to claim 1, wherein the trypsin-like or lysine-specific endopeptidase is selected from the group consisting of a polypeptide having an amino acid sequence which has at least 95% sequence identity to any of SEQ ID NOs: 1, 12 or 15.

17. The process according to claim 1, wherein the transglutaminase is selected from the group consisting of a polypeptide having an amino acid sequence which has at least 90% sequence identity to any of SEQ ID NOs: 13 or 14.

18. The process according to claim 1, wherein the transglutaminase is selected from the group consisting of a polypeptide having an amino acid sequence which has at least 95% sequence identity to any of SEQ ID NOs: 13 or 14.

\* \* \* \* \*

SEQUENCE LISTING

```
<160> NUMBER OF SEQ ID NOS: 15

<210> SEQ ID NO 1
<211> LENGTH: 224
<212> TYPE: PRT
<213> ORGANISM: Fusarium oxysporum

<400> SEQUENCE: 1

Ile Val Gly Gly Thr Ser Ala Ser Ala Gly Asp Phe Pro Phe Ile Val
1               5                   10                  15

Ser Ile Ser Arg Asn Gly Gly Pro Trp Cys Gly Gly Ser Leu Leu Asn
                20                  25                  30

Ala Asn Thr Val Leu Thr Ala Ala His Cys Val Ser Gly Tyr Ala Gln
            35                  40                  45

Ser Gly Phe Gln Ile Arg Ala Gly Ser Leu Ser Arg Thr Ser Gly Gly
        50                  55                  60

Ile Thr Ser Ser Leu Ser Ser Val Arg Val His Pro Ser Tyr Ser Gly
65                  70                  75                  80

Asn Asn Asn Asp Leu Ala Ile Leu Lys Leu Ser Thr Ser Ile Pro Ser
                85                  90                  95

Gly Gly Asn Ile Gly Tyr Ala Arg Leu Ala Ala Ser Gly Ser Asp Pro
            100                 105                 110

Val Ala Gly Ser Ser Ala Thr Val Ala Gly Trp Gly Ala Thr Ser Glu
        115                 120                 125

Gly Gly Ser Ser Thr Pro Val Asn Leu Leu Lys Val Thr Val Pro Ile
```

```
                130               135               140
Val Ser Arg Ala Thr Cys Arg Ala Gln Tyr Gly Thr Ser Ala Ile Thr
145                 150                 155                 160

Asn Gln Met Phe Cys Ala Gly Val Ser Ser Gly Lys Asp Ser Cys
                165                 170                 175

Gln Gly Asp Ser Gly Pro Ile Val Asp Ser Ser Asn Thr Leu Ile
                180                 185                 190

Gly Ala Val Ser Trp Gly Asn Gly Cys Ala Arg Pro Asn Tyr Ser Gly
                195                 200                 205

Val Tyr Ala Ser Val Gly Ala Leu Arg Ser Phe Ile Asp Thr Tyr Ala
                210                 215                 220
```

<210> SEQ ID NO 2
<211> LENGTH: 226
<212> TYPE: PRT
<213> ORGANISM: Fusarium sp.

<400> SEQUENCE: 2

```
Ile Val Gly Gly Thr Ala Ala Ser Ala Gly Asp Phe Pro Phe Ile Val
1               5                   10                  15

Ser Ile Ala Tyr Asn Gly Gly Pro Trp Cys Gly Gly Thr Leu Leu Asn
                20                  25                  30

Ala Ser Thr Val Leu Thr Ala Ala His Cys Thr Gln Gly Arg Ser Ala
                35                  40                  45

Ser Ala Phe Gln Val Arg Ala Gly Ser Leu Asn Arg Asn Ser Gly Gly
                50                  55                  60

Val Thr Ser Ala Val Ser Ser Ile Arg Ile His Pro Ser Phe Ser Gly
65                  70                  75                  80

Ser Thr Leu Asn Asn Asp Val Ser Ile Leu Lys Leu Ser Thr Pro Ile
                85                  90                  95

Ser Thr Ser Ser Thr Ile Ser Tyr Gly Arg Leu Ala Ala Ser Gly Ser
                100                 105                 110

Asp Pro Ala Ala Gly Ser Asp Ala Thr Val Ala Gly Trp Gly Val Thr
                115                 120                 125

Ser Gln Gly Ser Ser Ser Pro Val Ala Leu Arg Lys Val Thr Ile
                130                 135                 140

Pro Ile Val Ser Arg Thr Thr Cys Arg Ser Gln Tyr Gly Thr Ser Ala
145                 150                 155                 160

Ile Thr Thr Asn Met Phe Cys Ala Gly Leu Ala Glu Gly Gly Lys Asp
                165                 170                 175

Ser Cys Gln Gly Asp Ser Gly Gly Pro Ile Val Asp Thr Ser Asn Thr
                180                 185                 190

Val Ile Gly Ile Val Ser Trp Gly Glu Gly Cys Ala Gln Pro Asn Phe
                195                 200                 205

Ser Gly Val Tyr Ala Arg Val Gly Ser Leu Arg Ser Tyr Ile Asp Gly
                210                 215                 220

Gln Leu
225
```

<210> SEQ ID NO 3
<211> LENGTH: 225
<212> TYPE: PRT
<213> ORGANISM: Kutzneria albida

<400> SEQUENCE: 3

```
Ile Val Gly Gly Thr Lys Ala Ser Thr Ser Thr Tyr Pro Phe Val Val
```

-continued

```
              1               5                   10                  15
            Phe Leu Thr Asp Ser Thr Gly Phe Gln Phe Cys Gly Gly Thr Leu Val
                            20                  25                  30
            Lys Pro Asn Lys Val Val Thr Ala Ala His Cys Thr Val Gly Glu Ser
                            35                  40                  45
            Ala Ala Asn Ile Arg Val Val Ala Gly Arg Asp Asp Lys Gln Ser Thr
             50                              55                  60
            Ala Gly Thr Val Ser Lys Val Ser Lys Ile Trp Ile His Pro Ser Tyr
             65                  70                  75                  80
            Gln Asp Ala Thr Lys Gly Ser Asp Val Ser Val Leu Thr Leu Ser Thr
                                85                  90                  95
            Ser Leu Thr Gln Phe Thr Pro Leu Pro Leu Ala Ala Thr Thr Asp Thr
                            100                 105                 110
            Ala Leu Tyr Lys Glu Gly Thr Ala Ala Thr Ile Leu Gly Trp Gly Asp
                            115                 120                 125
            Thr Thr Glu Gly Gly Ser Ala Ser Arg Tyr Leu Leu Lys Ala Thr Val
            130                 135                 140
            Pro Leu Thr Ser Asp Ala Thr Cys Lys Lys Ala Tyr Gly Glu Tyr Ser
            145                 150                 155                 160
            Ser Thr Ala Met Val Cys Ala Gly Tyr Pro Gln Gly Gly Thr Asp Thr
                                165                 170                 175
            Cys Gln Gly Asp Ser Gly Gly Pro Leu Val Ala Gly Asn Lys Leu Ile
                            180                 185                 190
            Gly Ile Thr Ser Trp Gly Gln Gly Cys Ala Glu Ala Gly Tyr Pro Gly
                            195                 200                 205
            Val Tyr Thr Arg Val Ala Thr Tyr Ser Ser Leu Ile Thr Gln Gln Leu
                            210                 215                 220
            Gly
            225

<210> SEQ ID NO 4
<211> LENGTH: 231
<212> TYPE: PRT
<213> ORGANISM: Trichoderma reesei

<400> SEQUENCE: 4

Ile Val Gly Gly Thr Ala Ala Ser Leu Gly Glu Phe Pro Tyr Ile Val
             1               5                   10                  15
            Ser Leu Gln Asn Pro Asn Gln Gly Gly His Phe Cys Gly Gly Val Leu
                            20                  25                  30
            Val Asn Ala Asn Thr Val Val Thr Ala Ala His Cys Ser Val Val Tyr
                            35                  40                  45
            Pro Ala Ser Gln Ile Arg Val Arg Ala Gly Thr Leu Thr Trp Asn Ser
             50                              55                  60
            Gly Gly Thr Leu Val Gly Val Ser Gln Ile Ile Val Asn Pro Ser Tyr
             65                  70                  75                  80
            Asn Asp Arg Thr Thr Asp Phe Asp Val Ala Val Trp His Leu Ser Ser
                                85                  90                  95
            Pro Ile Arg Glu Ser Ser Thr Ile Gly Tyr Ala Thr Leu Pro Ala Gln
                            100                 105                 110
            Gly Ser Asp Pro Val Ala Gly Ser Thr Val Thr Thr Ala Gly Trp Gly
                            115                 120                 125
            Thr Thr Ser Glu Asn Ser Asn Ser Ile Pro Ser Arg Leu Asn Lys Val
            130                 135                 140
```

Ser Val Pro Val Val Ala Arg Ser Thr Cys Gln Ala Asp Tyr Arg Ser
145                 150                 155                 160

Gln Gly Leu Ser Val Thr Asn Asn Met Phe Cys Ala Gly Leu Thr Gln
            165                 170                 175

Gly Gly Lys Asp Ser Cys Ser Gly Asp Ser Gly Gly Pro Ile Val Asp
            180                 185                 190

Ala Asn Gly Val Leu Gln Gly Val Val Ser Trp Gly Ile Gly Cys Ala
        195                 200                 205

Glu Ala Gly Phe Pro Gly Val Tyr Thr Arg Ile Gly Asn Phe Val Asn
210                 215                 220

Tyr Ile Asn Gln Asn Leu Ala
225                 230

<210> SEQ ID NO 5
<211> LENGTH: 224
<212> TYPE: PRT
<213> ORGANISM: Actinosynnema mirum

<400> SEQUENCE: 5

Ile Val Gly Gly Thr Arg Ala Ser Ile Ser Glu Ala Pro Trp Thr Val
1               5                   10                  15

Tyr Leu Ala Ser Ser Gly Ser Gln Phe Cys Gly Gly Thr Leu Val
            20                  25                  30

Lys Ala Asn Lys Val Val Thr Ala Ala His Cys Val Ala Gly Arg Ser
            35                  40                  45

Ala Ser Ser Thr Arg Val Val Ile Gly Arg Glu Asp Lys Gln Ser Thr
50                  55                  60

Ala Gly Thr Val Ala Thr Val Ser Gly Ile Trp Ser His Pro Ser Tyr
65                  70                  75                  80

Arg Thr Ala Thr Ser Gly Tyr Asp Val Ala Val Leu Thr Leu Gly Thr
                85                  90                  95

Ser Val Ser Gly Thr Tyr Leu Pro Leu Ala Thr Pro Ser Asp Thr Ala
            100                 105                 110

Leu Tyr Ala Ala Gly Thr Asn Ala Val Ala Tyr Gly Trp Gly Ala Thr
        115                 120                 125

Cys Ser Gly Cys Ser Thr Ser Arg Tyr Leu Leu Lys Val Thr Val Pro
130                 135                 140

Val Thr Ser Asp Ala Thr Cys Lys Thr Ala Tyr Ser Gln Tyr Ser Asn
145                 150                 155                 160

Thr Ser Met Val Cys Ala Gly Val Pro Ala Gly Gly Lys Asp Thr Cys
                165                 170                 175

Gln Gly Asp Ser Gly Gly Pro Leu Val Ala Gly Gly Lys Leu Ile Gly
            180                 185                 190

Ala Thr Ser Trp Gly Asn Gly Cys Ala Leu Pro Asn Tyr Pro Gly Val
        195                 200                 205

Tyr Ala Arg Val Ala Ala Tyr Tyr Ser Val Leu Ser Ala Gln Ile Gly
    210                 215                 220

<210> SEQ ID NO 6
<211> LENGTH: 221
<212> TYPE: PRT
<213> ORGANISM: Kribbella flavida

<400> SEQUENCE: 6

Leu Ala Ala Ala Asn Val Pro Val Tyr Val His Val Met Arg Asp Ala
1               5                   10                  15

```
Ala Gly Asn Gly Asp Val Thr Asp Ser Gln Ile Ser Gln Gln Ile Ala
            20                  25                  30

Val Leu Asn Asn Thr Phe Ala Gly Gly Glu Ser Thr Ala Ala Ala Asn
            35                  40                  45

Thr Gly Phe Ser Phe Ser Leu Ala Gly Thr Tyr Arg Tyr Asn Asn Thr
         50                  55                  60

Gln Trp His Gln Asp Lys Gln Ser Ser Thr Tyr Arg Lys Gln Thr Arg
 65                  70                  75                  80

Lys Gly Gly Ala Asn Ala Leu Asn Ile Trp Leu Val Asp Phe Gly Tyr
                 85                  90                  95

Leu Gly Ile Ala Thr Phe Pro Trp Asp Tyr Gln Arg Gln Pro Gly Ile
            100                 105                 110

Asp Gly Ile Arg Val Gln Tyr Thr Ser Leu Pro Gly Gly Ser Glu Pro
            115                 120                 125

Asn Tyr Asn Leu Gly Glu Thr Ala Thr His Glu Ala Gly His Trp Phe
            130                 135                 140

Gly Leu Tyr His Thr Phe Gln Gly Gly Cys Thr Thr Thr Asn Asp Glu
145                 150                 155                 160

Val Ala Asp Thr Pro Ala Gln Gly Ser Pro Thr Asn Gly Cys Pro Thr
            165                 170                 175

Gly Arg Asp Ser Cys Ser Leu Pro Gly Leu Asp Pro Ile His Asn Tyr
            180                 185                 190

Met Asp Tyr Ser Tyr Asp Ser Cys Tyr Asn Gln Phe Thr Pro Asp Gln
            195                 200                 205

Ser Thr Arg Ile Ser Thr Met Trp Thr Ala Tyr Arg Ala
            210                 215                 220

<210> SEQ ID NO 7
<211> LENGTH: 226
<212> TYPE: PRT
<213> ORGANISM: Fusarium solani

<400> SEQUENCE: 7

Ile Val Gly Gly Thr Ala Ala Ser Ala Gly Asp Phe Pro Phe Ile Val
1               5                   10                  15

Ser Ile Ala Tyr Asn Gly Gly Pro Trp Cys Gly Gly Thr Leu Leu Asn
            20                  25                  30

Ala Asn Thr Val Met Thr Ala Ala His Cys Thr Gln Gly Arg Ser Ala
            35                  40                  45

Ser Ala Phe Gln Val Arg Ala Gly Ser Leu Asn Arg Asn Ser Gly Gly
         50                  55                  60

Val Thr Ser Ser Val Ser Ser Ile Arg Ile His Pro Ser Phe Ser Ser
 65                  70                  75                  80

Ser Thr Leu Asn Asn Asp Val Ser Ile Leu Lys Leu Ser Thr Pro Ile
                 85                  90                  95

Ser Thr Ser Ser Thr Ile Ser Tyr Gly Arg Leu Ala Ala Ser Gly Ser
            100                 105                 110

Asp Pro Val Ala Gly Ser Asp Ala Thr Val Ala Gly Trp Gly Val Thr
            115                 120                 125

Ser Gln Gly Ser Ser Ser Pro Val Ala Leu Arg Lys Val Thr Ile
            130                 135                 140

Pro Ile Val Ser Arg Thr Thr Cys Arg Ser Gln Tyr Gly Thr Ser Ala
145                 150                 155                 160

Ile Thr Thr Asn Met Phe Cys Ala Gly Leu Ala Glu Gly Gly Lys Asp
            165                 170                 175
```

Ser Cys Gln Gly Asp Ser Gly Gly Pro Ile Val Asp Thr Ser Asn Thr
            180                 185                 190

Val Ile Gly Ile Val Ser Trp Gly Glu Gly Cys Ala Gln Pro Asn Leu
            195                 200                 205

Ser Gly Val Tyr Ala Arg Val Gly Ser Leu Arg Thr Tyr Ile Asp Gly
            210                 215                 220

Gln Leu
225

<210> SEQ ID NO 8
<211> LENGTH: 227
<212> TYPE: PRT
<213> ORGANISM: Kribbella flavida

<400> SEQUENCE: 8

Ile Val Gly Gly Ser Leu Ala Ser Thr Ala Gln Ala Pro Trp Ala Ile
1               5                   10                  15

Ala Leu Asn Asn Ser Gln Ser Pro Ser Pro Ser Gly Trp Cys Gly
            20                  25                  30

Ala Thr Leu Val Lys Ala Asn Lys Ile Val Thr Ala Ala His Cys Val
        35                  40                  45

Thr Lys Ala Arg Ser Thr Tyr Thr Ala Ile Gln Gly Arg Asp Ser Leu
    50                  55                  60

Ser Ser Thr Thr Gly Arg Thr Ser Lys Ile Ala Ser Ile Trp Lys Asp
65                  70                  75                  80

Pro Gln Tyr Gly Arg Ala Pro Gly His Asp Val Ala Val Leu Thr Leu
                85                  90                  95

Ala Thr Pro Phe Thr Gly Val Pro Thr Leu Pro Leu Glu Thr Ser Leu
            100                 105                 110

Ala Ala Asp Ala Val Gly Ala Gln Pro Thr Val Tyr Gly Trp Gly Asn
        115                 120                 125

Thr Glu Gly Thr Gly Pro Ala Asp Arg Phe Gln Lys Val Leu Val Pro
    130                 135                 140

Val Leu Gly Asp Ala Tyr Cys Gly Gln Val Tyr Ala Asn Tyr Asp Tyr
145                 150                 155                 160

Val Ala Asn Gly Glu Ile Cys Ala Gly Tyr Lys Glu Gly Gly Lys Asp
                165                 170                 175

Ser Cys Gln Gly Asp Ser Gly Gly Pro Leu Val Leu Asn Gly Arg Leu
            180                 185                 190

Phe Gly Val Val Ser Trp Gly Ile Gly Cys Ala Asp Ala Gly Asn Pro
        195                 200                 205

Gly Val Tyr Ala Glu Val Ala Thr Tyr Ala Ala Ala Leu Thr Ala Gln
    210                 215                 220

Ile Asn Ser
225

<210> SEQ ID NO 9
<211> LENGTH: 472
<212> TYPE: PRT
<213> ORGANISM: Aspergillus niger

<400> SEQUENCE: 9

Gly Val Leu Leu Pro Leu Thr Ser Lys Gly Pro Ser Ala Lys His Thr
1               5                   10                  15

Lys Lys Tyr Lys Pro Leu Lys Gln Thr Ser Val Asn Ala Thr Ser Leu
            20                  25                  30

```
Thr Thr Cys Asp Glu Val Ile Thr Pro Ala Cys Val Ala Ala Leu Tyr
        35                  40                  45

Lys Ile Pro His Ala Ser Gly Asn Val Ser Ala Ser Asn Ser Leu Gly
 50                  55                  60

Ile Phe Glu Gly Asp Tyr Tyr Ala Gln Glu Asp Leu Asp Leu Phe
 65                  70                  75                  80

Phe Arg Asn Phe Thr Pro Tyr Ile Pro Lys Gly Thr His Pro Lys Pro
                 85                  90                  95

Ala Phe Ile Asp Gly Ala Ser Ala Pro Val Ser Val Ala Asp Ala Gly
                100                 105                 110

Ala Glu Ser Asp Leu Asp Phe Gln Leu Ala Tyr Pro Ile Val Tyr Pro
            115                 120                 125

Gln Thr Ile Thr Leu Tyr Gln Thr Asp Asp Tyr Asp Tyr Ala Ser Gly
        130                 135                 140

Glu Val Glu Thr Asp Gly Phe Phe Asn Thr Phe Leu Asp Ala Val Asp
145                 150                 155                 160

Gly Ser Tyr Cys Thr Tyr Cys Ala Tyr Gly Glu Cys Gly Asp Ser Pro
                165                 170                 175

Thr Leu Asp Pro Thr Tyr Pro Asp Asn Ser Thr Gly Gly Tyr Lys Gly
                180                 185                 190

Gln Leu Met Cys Gly Val Tyr Lys Pro Thr Asn Val Ile Ser Val Ser
            195                 200                 205

Tyr Gly Gly Gln Glu Ala Asp Leu Pro Ala Tyr Tyr Gln Gln Arg Gln
210                 215                 220

Cys Asn Glu Phe Leu Lys Leu Gly Leu Gln Gly Ile Ser Ile Leu Phe
225                 230                 235                 240

Ala Ser Gly Asp Asp Gly Val Ala Gly Pro Pro Gly Asp Asp Ser Thr
                245                 250                 255

Asn Gly Cys Leu Gly Asn Gly Thr Ile Phe Ser Pro Ala Phe Pro Asn
                260                 265                 270

Ser Cys Pro Trp Val Thr Asn Val Gly Ala Thr Lys Leu Tyr Pro Gly
            275                 280                 285

Lys Thr Ile Ala Asp Gly Glu Ser Ala Val Val Asp Pro Ala Gly His
        290                 295                 300

Pro Tyr Ser Val Ala Phe Ser Ser Gly Gly Phe Ser Asn Ile Tyr
305                 310                 315                 320

Thr Ile Pro Asp Tyr Gln Ala Glu Ala Val Ala Glu Tyr Phe Lys Lys
                325                 330                 335

His Asn Pro Pro Tyr Pro Tyr Glu Gly Asn Ala Ser Phe Gly Lys
                340                 345                 350

Asn Gly Gly Val Tyr Asn Arg Leu Gly Arg Gly Tyr Pro Asp Val Ala
            355                 360                 365

Ala Asn Gly Asp Asn Ile Ala Glu Tyr Asn Ala Gly Glu Phe Ile Leu
        370                 375                 380

Glu Gly Gly Thr Ser Ala Ser Thr Pro Ile Phe Ser Ser Val Ile Asn
385                 390                 395                 400

Arg Ile Ile Glu Lys Arg Ile Ala Ala Gly Lys Gly Pro Leu Gly Phe
                405                 410                 415

Leu Asn Pro Val Leu Tyr Arg Asn Ala Trp Ala Leu Asn Asp Ile Thr
            420                 425                 430

Asn Gly Ser Asn Pro Gly Cys Gly Thr Glu Gly Phe Tyr Thr Ala Pro
        435                 440                 445
```

```
Gly Trp Asp Pro Val Thr Gly Leu Gly Thr Pro Asn Phe Pro Lys Leu
            450                 455                 460

Leu Asp Val Phe Leu Asn Leu Pro
465                 470

<210> SEQ ID NO 10
<211> LENGTH: 437
<212> TYPE: PRT
<213> ORGANISM: Aspergillus oryzae

<400> SEQUENCE: 10

Gly Leu Asn Val Thr Asn Cys Asp Gln Leu Ile Thr Pro Glu Cys Ile
1               5                   10                  15

Arg Ala Leu Tyr Lys Ile Pro Ser Ala Arg Ala Ala Pro His Pro Asn
            20                  25                  30

Asn Ser Leu Gly Ile Phe Glu Glu Gly Asp Tyr Tyr Ala Gln Glu Asp
        35                  40                  45

Leu Asp Leu Phe Phe Lys Thr Phe Ala Lys Asp Ile Pro Gln Gly Thr
50                  55                  60

His Pro Ile Pro Ala Phe Ile Asp Gly Ala Glu Ala Pro Val Pro Val
65                  70                  75                  80

Thr Lys Ala Gly Gly Glu Ser Asp Leu Asp Phe Glu Leu Ala Tyr Pro
                85                  90                  95

Ile Val His Pro Gln Ser Ile Thr Leu Tyr Gln Thr Asp Asp Ala Asn
            100                 105                 110

Trp Ala Ser Asn Thr Thr Gly Phe Leu Asn Thr Phe Leu Asp Ala Leu
        115                 120                 125

Asp Gly Ser Tyr Cys Thr Tyr Cys Ala Tyr Gly Glu Cys Gly Asn Asp
130                 135                 140

Pro Ser Leu Asp Pro Val Tyr Pro Asp Asp Ala Gly Tyr Asp Gly Gln
145                 150                 155                 160

Leu Met Cys Gly Val Phe Lys Pro Thr Asn Val Ile Ser Val Ser Tyr
                165                 170                 175

Gly Glu Gln Glu Asn Asp Leu Pro Ala Asn Tyr Gln Gln Arg Gln Cys
            180                 185                 190

Met Glu Phe Leu Lys Leu Gly Leu Gln Gly Val Ser Val Leu Phe Ala
        195                 200                 205

Ser Gly Asp Asn Gly Val Ala Gly Pro Pro Gly Asp Gly Asn Ser Val
210                 215                 220

Asn Gly Cys Leu Asn Asn Gly Thr Val Phe Ser Pro Ala Phe Pro Asn
225                 230                 235                 240

Ser Cys Pro Tyr Ile Thr Asn Val Gly Ala Thr Lys Val Tyr Pro Gly
                245                 250                 255

Tyr Thr Val Ser Gln Pro Glu Ser Ala Val Tyr Asp Pro Asp Gly Leu
            260                 265                 270

Tyr Ser Tyr Ala Ser Gly Gly Phe Ser Asn Ile Tyr Pro Ile Pro
        275                 280                 285

Asp Tyr Gln Ala Glu Ala Val Ala Thr Tyr Phe Lys Asp His Asn Pro
290                 295                 300

Pro Tyr Pro Tyr Glu Gly Ala Glu Asn Leu Gly Lys Asn Gly Gly
305                 310                 315                 320

Leu Tyr Asn Arg Leu Gly Arg Gly Tyr Pro Asp Val Ala Ala Asn Gly
                325                 330                 335

Asp Asn Ile Ala Val Phe Asn Gly Gly Glu Phe Gly Ser Ser Gly Gly
            340                 345                 350
```

```
Thr Ser Ala Ser Thr Pro Ile Phe Ala Ser Ile Ile Asn Arg Ile Ile
        355                 360                 365
Asp Glu Arg Leu Ala Val Gly Lys Gly Pro Val Gly Phe Ile Asn Pro
    370                 375                 380
Val Leu Tyr Lys Asn Pro Ser Val Leu Asn Asp Ile Thr Asn Gly Thr
385                 390                 395                 400
Asn Pro Gly Cys Gly Thr Asp Gly Phe Ser Thr Ala Pro Gly Trp Asp
                405                 410                 415
Pro Ala Thr Gly Leu Gly Thr Pro Asn Tyr Pro Lys Met Leu Lys Leu
            420                 425                 430
Trp Leu Asp Leu Pro
        435

<210> SEQ ID NO 11
<211> LENGTH: 182
<212> TYPE: PRT
<213> ORGANISM: Shewanella woodyi

<400> SEQUENCE: 11

Lys Pro Gly Gly Gly Asp Gly Gly Glu Val Asp Gly Val Thr Phe
1               5                   10                  15
Thr Gly Arg Cys Ser Asn Ser Gln Lys Thr Asp Ile Leu Ala Gly Leu
            20                  25                  30
Asp Ala Ala Lys Gly Met Ser Ala Asp Ala Asn Gln His Leu Asn Gly
        35                  40                  45
Asn Asn Ser Ser Ser Thr Arg Tyr Asn Thr Trp Phe Gly Asn Tyr Ser
    50                  55                  60
Ser Ser Arg Trp Asn Thr Val Ser Asn Asn Phe Ser Lys Ile Asp Ser
65                  70                  75                  80
Ala Leu Asn Asn Glu Pro Leu Thr Ile Asp Cys Ser Cys Lys Lys Arg
                85                  90                  95
Tyr Phe Ala Tyr Val Tyr Pro Thr Gln Pro Tyr Lys Ile Tyr Met Cys
            100                 105                 110
Arg Ala Phe Trp Ser Ala Pro Thr Thr Gly Thr Asp Ser Lys Gly Gly
        115                 120                 125
Thr Ile Ile His Glu Met Ser His Phe Asn Val Val Ala Gly Thr Asp
    130                 135                 140
Asp Ile Val Tyr Gly Gln Ser Gly Ala Lys Ala Leu Ala Ile Ser Asp
145                 150                 155                 160
Pro Ala Gln Ala Ile Gln Asn Ala Asp Ser His Glu Tyr Phe Ala Glu
                165                 170                 175
Asn Thr Pro Asn Leu Asn
            180

<210> SEQ ID NO 12
<211> LENGTH: 223
<212> TYPE: PRT
<213> ORGANISM: Porcinus

<400> SEQUENCE: 12

Ile Val Gly Gly Tyr Thr Cys Ala Ala Asn Ser Ile Pro Tyr Gln Val
1               5                   10                  15
Ser Leu Asn Ser Gly Ser His Phe Cys Gly Gly Ser Leu Ile Asn Ser
            20                  25                  30
Gln Trp Val Val Ser Ala Ala His Cys Tyr Lys Ser Arg Ile Gln Val
        35                  40                  45
```

Arg Leu Gly Glu His Asn Ile Asp Val Leu Glu Gly Asn Glu Gln Phe
     50                  55                  60

Ile Asn Ala Ala Lys Ile Ile Thr His Pro Asn Phe Asn Gly Asn Thr
 65              70                  75                  80

Leu Asp Asn Asp Ile Met Leu Ile Lys Leu Ser Ser Pro Ala Thr Leu
                 85                  90                  95

Asn Ser Arg Val Ala Thr Val Ser Leu Pro Arg Ser Cys Ala Ala Ala
            100                 105                 110

Gly Thr Glu Cys Leu Ile Ser Gly Trp Gly Asn Thr Lys Ser Ser Gly
            115                 120                 125

Ser Ser Tyr Pro Ser Leu Leu Gln Cys Leu Lys Ala Pro Val Leu Ser
            130                 135                 140

Asp Ser Ser Cys Lys Ser Ser Tyr Pro Gly Gln Ile Thr Gly Asn Met
145                 150                 155                 160

Ile Cys Val Gly Phe Leu Glu Gly Gly Lys Asp Ser Cys Gln Gly Asp
                165                 170                 175

Ser Gly Gly Pro Val Val Cys Asn Gly Gln Leu Gln Gly Ile Val Ser
            180                 185                 190

Trp Gly Tyr Gly Cys Ala Gln Lys Asn Lys Pro Gly Val Tyr Thr Lys
            195                 200                 205

Val Cys Asn Tyr Val Asn Trp Ile Gln Gln Thr Ile Ala Ala Asn
210                 215                 220

<210> SEQ ID NO 13
<211> LENGTH: 331
<212> TYPE: PRT
<213> ORGANISM: Streptomyces mobaraensis

<400> SEQUENCE: 13

Asp Ser Asp Asp Arg Val Thr Pro Pro Ala Glu Pro Leu Asp Arg Met
 1               5                  10                  15

Pro Asp Pro Tyr Arg Pro Ser Tyr Gly Arg Ala Glu Thr Val Val Asn
             20                  25                  30

Asn Tyr Ile Arg Lys Trp Gln Gln Val Tyr Ser His Arg Asp Gly Arg
         35                  40                  45

Lys Gln Gln Met Thr Glu Glu Gln Arg Glu Trp Leu Ser Tyr Gly Cys
 50                  55                  60

Val Gly Val Thr Trp Val Asn Ser Gly Gln Tyr Pro Thr Asn Arg Leu
 65              70                  75                  80

Ala Phe Ala Ser Phe Asp Glu Asp Arg Phe Lys Asn Glu Leu Lys Asn
                 85                  90                  95

Gly Arg Pro Arg Ser Gly Glu Thr Arg Ala Glu Phe Glu Gly Arg Val
            100                 105                 110

Ala Lys Glu Ser Phe Asp Glu Glu Lys Gly Phe Gln Arg Ala Arg Glu
            115                 120                 125

Val Ala Ser Val Met Asn Arg Ala Leu Glu Asn Ala His Asp Glu Ser
            130                 135                 140

Ala Tyr Leu Asp Asn Leu Lys Lys Glu Leu Ala Asn Gly Asn Asp Ala
145                 150                 155                 160

Leu Arg Asn Glu Asp Ala Arg Ser Pro Phe Tyr Ser Ala Leu Arg Asn
                165                 170                 175

Thr Pro Ser Phe Lys Glu Arg Asn Gly Gly Asn His Asp Pro Ser Arg
            180                 185                 190

Met Lys Ala Val Ile Tyr Ser Lys His Phe Trp Ser Gly Gln Asp Arg

```
                195                 200                 205
Ser Ser Ser Ala Asp Lys Arg Lys Tyr Gly Asp Pro Asp Ala Phe Arg
210                 215                 220

Pro Ala Pro Gly Thr Gly Leu Val Asp Met Ser Arg Asp Arg Asn Ile
225                 230                 235                 240

Pro Arg Ser Pro Thr Ser Pro Gly Glu Gly Phe Val Asn Phe Asp Tyr
                245                 250                 255

Gly Trp Phe Gly Ala Gln Thr Glu Ala Asp Ala Asp Lys Thr Val Trp
                260                 265                 270

Thr His Gly Asn His Tyr His Ala Pro Asn Gly Ser Leu Gly Ala Met
                275                 280                 285

His Val Tyr Glu Ser Lys Phe Arg Asn Trp Ser Glu Gly Tyr Ser Asp
                290                 295                 300

Phe Asp Arg Gly Ala Tyr Val Ile Thr Phe Ile Pro Lys Ser Trp Asn
305                 310                 315                 320

Thr Ala Pro Asp Lys Val Lys Gln Gly Trp Pro
                325                 330

<210> SEQ ID NO 14
<211> LENGTH: 418
<212> TYPE: PRT
<213> ORGANISM: Streptomyces lydicus

<400> SEQUENCE: 14

Met Tyr Lys Arg Arg Ser Leu Leu Ala Phe Ala Thr Val Ser Ala Ala
1               5                   10                  15

Ile Phe Thr Ala Gly Val Met Pro Ser Val Ser His Ala Ala Ser Gly
                20                  25                  30

Gly Asp Gly Glu Arg Glu Gly Ser Tyr Ala Glu Thr His Gly Leu Thr
            35                  40                  45

Ala Glu Asp Val Lys Asn Ile Asn Ala Leu Asn Lys Arg Ala Leu Asn
        50                  55                  60

Ala Gly Gln Pro Gly Asn Ser Leu Ala Glu Leu Pro Pro Ser Val Ser
65                  70                  75                  80

Ala Leu Phe Arg Ala Pro Asp Ala Ala Asp Glu Arg Val Thr Pro Pro
                85                  90                  95

Ala Glu Pro Leu Asn Arg Met Pro Asp Ala Tyr Arg Ala Tyr Gly Gly
                100                 105                 110

Arg Ala Thr Thr Val Val Asn Asn Tyr Ile Arg Lys Trp Gln Gln Val
            115                 120                 125

Tyr Ser His Arg Asp Gly Ile Gln Gln Gln Met Thr Glu Glu Gln Arg
        130                 135                 140

Glu Lys Leu Ser Tyr Gly Cys Val Gly Ile Thr Trp Val Asn Ser Gly
145                 150                 155                 160

Pro Tyr Pro Thr Asn Lys Leu Ala Phe Ala Phe Phe Asp Glu Asn Lys
                165                 170                 175

Tyr Lys Ser Asp Leu Glu Asn Ser Arg Pro Arg Pro Asn Glu Thr Gln
                180                 185                 190

Ala Glu Phe Glu Gly Arg Ile Val Lys Asp Ser Phe Asp Gly Lys
            195                 200                 205

Gly Phe Lys Arg Ala Arg Asp Val Ala Ser Val Met Asn Lys Ala Leu
        210                 215                 220

Asp Ser Ala His Asp Glu Gly Thr Tyr Ile Asp Asn Leu Lys Thr Glu
225                 230                 235                 240
```

```
Leu Ala Asn Lys Asn Asp Ala Leu Arg Tyr Glu Asp Gly Arg Ser Asn
                245                 250                 255

Phe Tyr Ser Ala Leu Arg Asn Thr Pro Ser Phe Lys Glu Arg Asp Gly
            260                 265                 270

Gly Asn Tyr Asp Pro Ser Lys Met Lys Ala Val Val Tyr Ser Lys His
        275                 280                 285

Phe Trp Ser Gly Gln Asp Gln Arg Gly Ser Ser Asp Lys Arg Lys Tyr
    290                 295                 300

Gly Asp Pro Asp Ala Phe Arg Pro Asp Gln Gly Thr Gly Leu Val Asp
305                 310                 315                 320

Met Ser Lys Asp Arg Asn Ile Pro Arg Ser Pro Ala Gln Pro Gly Glu
                325                 330                 335

Ser Trp Val Asn Phe Asp Tyr Gly Trp Phe Gly Ala Gln Thr Glu Ser
            340                 345                 350

Asp Ala Asp Lys Thr Ile Trp Thr His Ala Asn His Tyr His Ala Pro
        355                 360                 365

Asn Gly Gly Leu Gly Pro Met Asn Val Tyr Glu Ser Lys Phe Arg Asn
    370                 375                 380

Trp Ser Ala Gly Tyr Ala Asp Phe Asp Arg Gly Thr Tyr Val Ile Thr
385                 390                 395                 400

Phe Ile Pro Lys Ser Trp Asn Thr Ala Pro Ala Glu Val Lys Gln Gly
                405                 410                 415

Trp Ser

<210> SEQ ID NO 15
<211> LENGTH: 275
<212> TYPE: PRT
<213> ORGANISM: Achromobacter lyticus

<400> SEQUENCE: 15

Ser Leu Ala Lys Arg Asp Val Pro Val Cys Asn Ile Asp Val Val Cys
1               5                   10                  15

Pro Glu Gly Asp Gly Arg Arg Asp Ile Ile Arg Ala Val Gly Ala Tyr
                20                  25                  30

Ser Lys Ser Gly Thr Leu Ala Cys Thr Gly Ser Leu Val Asn Asn Thr
            35                  40                  45

Ala Asn Asp Arg Lys Met Tyr Phe Leu Thr Ala His His Cys Gly Met
        50                  55                  60

Gly Thr Ala Ser Thr Ala Ala Ser Ile Val Val Tyr Trp Asn Tyr Gln
65                  70                  75                  80

Asn Ser Thr Cys Arg Ala Pro Asn Thr Pro Ala Ser Gly Ala Asn Gly
                85                  90                  95

Asp Gly Ser Met Ser Gln Thr Gln Ser Gly Ser Thr Val Lys Ala Thr
                100                 105                 110

Tyr Ala Thr Ser Asp Phe Thr Leu Leu Glu Leu Asn Asn Ala Ala Asn
            115                 120                 125

Pro Ala Phe Asn Leu Phe Trp Ala Gly Trp Asp Arg Arg Asp Gln Asn
        130                 135                 140

Tyr Pro Gly Ala Ile Ala Ile His His Pro Asn Val Ala Glu Lys Arg
145                 150                 155                 160

Ile Ser Asn Ser Thr Ser Pro Thr Ser Phe Val Ala Trp Gly Gly Gly
                165                 170                 175

Ala Gly Thr Thr His Leu Asn Val Gln Trp Gln Pro Ser Gly Gly Val
            180                 185                 190
```

```
                    -continued
Thr Glu Pro Gly Ser Ser Gly Ser Pro Ile Tyr Ser Pro Glu Lys Arg
        195                 200             205

Val Leu Gly Gln Leu His Gly Gly Pro Ser Ser Cys Ser Ala Thr Gly
        210             215             220

Thr Asn Arg Ser Asp Gln Tyr Gly Arg Val Phe Thr Ser Trp Thr Gly
225             230             235                     240

Gly Gly Ala Ala Ala Ser Arg Leu Ser Asp Trp Leu Asp Pro Ala Ser
            245             250             255

Thr Gly Ala Gln Phe Ile Asp Gly Leu Asp Ser Gly Gly Gly Thr Pro
            260             265             270

Asn Thr Pro
        275
```